United States Patent

Harada

[11] Patent Number: 6,094,536
[45] Date of Patent: *Jul. 25, 2000

[54] FLASH PHOTOGRAPHY SYSTEM USING PRELIMINARY EMISSION AND CONTROLLED MAIN EMISSION

[75] Inventor: Yoshihito Harada, Kanagawa-ken, Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/680,804

[22] Filed: Jul. 16, 1996

[30] Foreign Application Priority Data

| Jul. 21, 1995 | [JP] | Japan | 7-206770 |
| Jul. 21, 1995 | [JP] | Japan | 7-206771 |
| Jul. 28, 1995 | [JP] | Japan | 7-193682 |
| Aug. 17, 1995 | [JP] | Japan | 7-209668 |

[51] Int. Cl.[7] ............ G03B 3/10; G03B 13/34; G03B 15/03; G03B 7/099
[52] U.S. Cl. ............ 396/121; 396/157; 396/172
[58] Field of Search ............ 396/155–159, 396/121, 172

[56] References Cited

U.S. PATENT DOCUMENTS

| Re. 32,437 | 6/1987 | Taniguchi et al. | 354/415 |
| 3,690,229 | 9/1972 | Kikuchi et al. | 95/10 |
| 3,906,516 | 9/1975 | Harvey | 354/27 |
| 4,275,335 | 6/1981 | Ishida | 315/241 P |
| 4,291,979 | 9/1981 | Yuasa et al. | 356/218 |
| 4,305,647 | 12/1981 | Ishida | 354/33 |
| 4,373,793 | 2/1983 | Taniguchi et al. | 354/31 |
| 4,572,644 | 2/1986 | Kataoka et al. | 354/415 |
| 4,591,762 | 5/1986 | Nakamura | 315/241 |
| 4,655,576 | 4/1987 | Yuasa et al. | 354/415 |
| 4,702,585 | 10/1987 | Harada et al. | 354/410 |
| 4,705,382 | 11/1987 | Mukai et al. | 354/412 |
| 5,210,569 | 5/1993 | Harada | 354/442 |
| 5,231,447 | 7/1993 | Takagi | 354/415 |
| 5,267,015 | 11/1993 | Kai | 356/218 |
| 5,268,730 | 12/1993 | Takagi | 354/415 |
| 5,283,610 | 2/1994 | Sasaki | 354/416 |
| 5,309,193 | 5/1994 | Takagi | 354/415 |
| 5,371,568 | 12/1994 | Takagi et al. | 354/415 |
| 5,402,201 | 3/1995 | Takagi | 354/415 |
| 5,422,702 | 6/1995 | Yasukawa | 354/415 |
| 5,515,132 | 5/1996 | Iwasaki | 354/432 |
| 5,572,281 | 11/1996 | Suzuki et al. | 396/121 |
| 5,652,929 | 7/1997 | Yasukawa | 396/157 |
| 5,752,089 | 5/1998 | Miyazawa et al. | 396/48 |
| 5,809,350 | 9/1998 | Fukui | 396/166 |
| 5,839,005 | 11/1998 | Fukui | 396/159 |

FOREIGN PATENT DOCUMENTS

| 0512508A1 | 11/1992 | European Pat. Off. | G03B 15/05 |
| 0585723A1 | 3/1994 | European Pat. Off. | G03B 7/16 |
| 0588438A1 | 3/1994 | European Pat. Off. | G03B 7/099 |
| 3101799A1 | 12/1981 | Germany | G03B 15/05 |
| 60-150038 | 8/1985 | Japan | G03B 15/05 |

OTHER PUBLICATIONS

Operational Amplifier Circuits Theory and Applications by E.J. Kennedy. Saunders College Publishing, pp. 397–401, 1988.

*Primary Examiner*—Safet Metjahic
*Assistant Examiner*—Christopher Mahoney
*Attorney, Agent, or Firm*—Fitzpatrick, Cella, Harper & Scinto

[57] ABSTRACT

A flash photography system arranged to make preliminary emission and to control main emission according to a value of light measured at the time of the preliminary emission is capable of adequately performing main flat emission by making the preliminary emission in the mode of flat emission and controlling a peak value of the main flat emission according to data of light measured when the preliminary flat emission is made.

22 Claims, 20 Drawing Sheets

ARRANGEMENT OF AREAS OF LIGHT MEASURING SENSOR

ARRANGEMENT OF AREAS OF AF SENSOR

ORDER OF SPLIT LIGHT MEASUREMENT

WHERE AVERAGE VALUE IS EMPLOYED UPON A/D CONVERSION
EIGHT TIMES FOR EACH AREA (WHEN DISTANCE MEASURING POINT IS LEFT ONE) S5→S4→S2→S3→S0→S1

(WHEN DISTANCE MEASURING POINT IS RIGHT ONE) S5→S3→S1→S4→S0→S2

FLASH PHOTOGRAPHY SYSTEM USING PRELIMINARY EMISSION AND CONTROLLED MAIN EMISSION

BACKGROUND OF THE INVENTION

1. Field the Invention

The present invention relates to an improvement on a flash-device light control system arranged to measure a reflected light resulting from preliminary emission of a flash device and to control main emission of the flash device on the basis of a measured value of the reflected light.

2. Description of the Related Art

Heretofore, there is known a preliminary emission system, called an FELK system, in which a reflected light resulting from preliminary emission made by a flash device in response to a manual operation is measured and the flash device is caused to make main emission at an amount of emission which is a predetermined number of times as large as an amount of emission of the preliminary emission on the basis of a measured value of the reflected light.

According to the conventional arrangement of the preliminary emission system, however, it has been impossible to accurately control the amount of flash emission of the flash device and also to accurately control the so-called flat emission of the flash device.

SUMMARY OF THE INVENTION

It is a principal object of the present invention to provide a flash photography system which is capable of accurately controlling not only the amount of flash emission but also flat emission of a flash device.

It is one aspect of the invention under the above-stated object to provide a flash photography system in which control data for determining an amount of emission of main emission is obtained on the basis of a measured value of light obtained by preliminary emission and a measured value of external light, and the main emission is controlled on the basis of the control data.

It is another aspect of the invention under the above-stated object to provide a flash photography system in which flat emission is made as preliminary emission and a peak value of a main flat emission is determined on the basis of measured data of light obtained by the preliminary flat emission, so that the main flat emission is correctly made.

It is a further aspect of the invention under the above-stated object to provide a flash photography system, in which, to make preliminary emission, there are provided a first mode in which preliminary emission is made when an operation member is operated and a second mode in which preliminary emission is made when a shutter release operation is performed. In the first mode, preliminary emission can be made independently of a start point of photographing, and light measurement is performed to obtain control data for determining an amount of emission of main emission on the basis of a measured value of light obtained from a predetermined area corresponding to a distance measuring area selected. In the second mode, on the other hand, light measurement is performed to obtain the above-stated control data according to measured light values of a plurality of areas. The flash photography system thus performs a light measuring action in a manner suited to the characteristic of each of the preliminary emission modes.

It is a further aspect of the invention under the above-stated object to provide a flash photography system, in which flat emission is made as preliminary emission to obtain control data for determining an amount of emission of main emission on the basis of measured light values of a plurality of areas, and, in obtaining the control data, in order to avoid any adverse effects of measured light values that result from the instability of the characteristic of emission in the initial state of the preliminary flat emission, a light measuring action on an area having a higher degree of importance than other areas among the plurality of light measuring areas is allowed to be performed after completion of the light measuring action on the other areas, so that a measured light value of a higher degree of importance can be obtained after stabilization of the emission.

It is a further aspect of the invention under the above-stated object to provide a flash photography system, in which light measurement is inhibited until preliminary emission is stabilized, and control data for determining an amount of emission of main emission is obtained from the result of light measurement which is made in the state where the characteristic of emission of preliminary emission is stabilized.

It is a further aspect of the invention under the above-stated object to provide a flash photography system, in which the timing of obtaining the result of a light measuring action performed when preliminary emission is made and that of obtaining a measured value of external light are arranged such that an external light measuring action is allowed to be performed at a point of time near the time of preliminary emission or each of the light measuring actions is allowed to be performed in synchronism with the period of flickering of external light, so that both the measured value of external light and the measured value of light obtained at the time of preliminary emission can be prevented from being affected by the flicker of external light, to permit accurate flash light control.

It is a further aspect of the invention under the above-stated object to provide a flash photography system, in which, to make preliminary emission, there are provided a first mode in which preliminary emission is made for a first preliminary emission time and a second mode in which preliminary emission is made for a second preliminary emission time longer than the first preliminary emission time. In order to obtain control data for determining an amount of emission of main emission, when the first mode is selected, a measured light value is obtained from a predetermined area or areas among a plurality of light measuring areas, and when the second mode is selected, a measured light value is obtained from a greater number of areas than the number of areas used in the first mode, so that processes suited to each of the first and second modes are carried out.

It is a still further aspect of the invention under the above-stated object to provide a flash photography system, in which flat emission is made as main emission when a shutter time is shorter than a synchronizing shutter time, and ordinary flash emission is made as main emission when the shutter time is longer than the synchronizing shutter time.

The above and other objects and aspects of the present invention will become apparent from the following detailed description of embodiments thereof taken in connection with the accompanying drawings.

DETAILED DESCRIPTION OF THE PREFERRED EMBODIMENTS

The present invention will be described in detail in the following description of embodiments thereof shown in the accompanying drawings.

Figure 1:
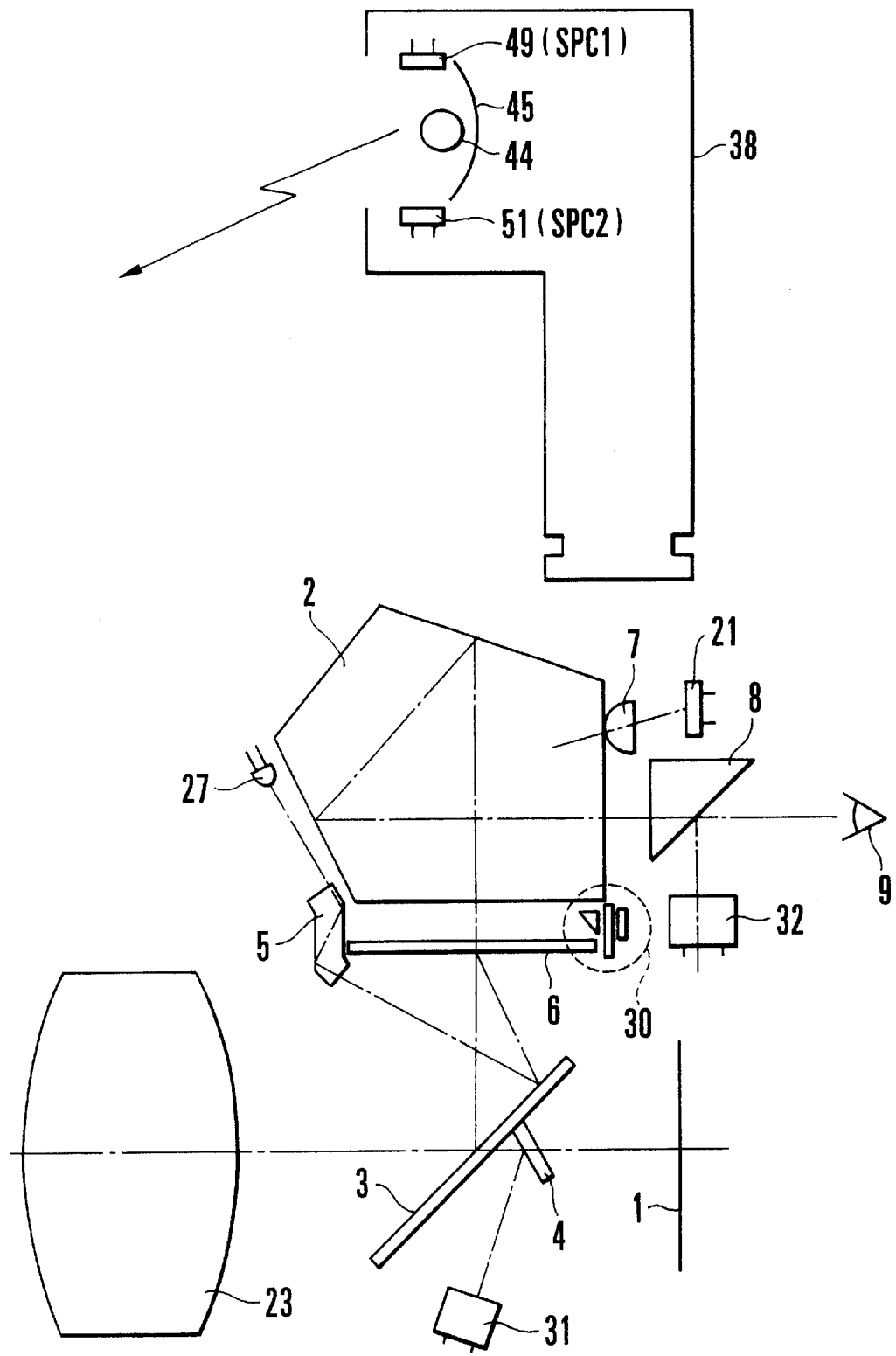
FIG. 1 shows the arrangement of essential parts of a camera and a flash device constituting a flash photography system which relates to an embodiment of the invention.

FIG. 1 shows essential parts of a camera and a flash device including a sensor, optical members, etc. constituting a flash photography system arranged as the embodiment of the invention. The illustration includes a film surface 1, a pentagonal prism 2, a main mirror 3, a sub-mirror 4 and a superimposing prism 5. A focusing screen 6 is provided with an array of micro prisms which are arranged in the middle part of the focusing screen 6. A lens 7 is provided for measuring light. A prism 8 is arranged to guide light to a visual-line detecting part 32. Reference numeral 9 denotes an eye of the operator of the system.

The flash device 38 includes a reflection shade 45 and a xenon lamp 44, a silicon photodiode 49 (SPC 1) which is provided for monitoring the amount of emission and another silicon photodiode 51 (SPC 2) which is provided for monitoring the peak value (intensity) of the emission.

The light emitted from the flash device 38 is reflected by an object of shooting which is not shown. The reflected light passes through a lens 23 and the main mirror 3 and is then guided by the sub-mirror 4 to an AF sensor 31. Meanwhile, a part of light reflected by the main mirror 3 which is arranged to be a half-mirror in its middle part reaches the eye 9 of the operator through the focusing screen 6 and the pentagonal prism 2.

An image formed on the focusing screen 6 reaches the light measuring sensor 21 through the pentagonal prism 2 and the light measuring lens 7. A display device 30 which is disposed within the viewfinder of the camera is composed of a back light part, an LCD, a prism, etc., and is arranged to display information in a lower part of the viewfinder.

A superimposing display device 27 is arranged to make a superimposed display. Light from the superimposing display device 27 passes through the prism 5 and is reflected by the main mirror 3 to have its direction varied by the micro-prism array of the focusing screen 6. The superimposing display device 27 is thus arranged to enable the operator to see a distance measuring frame, (a distance measuring point) as a superimposed display.

Figure 2A:
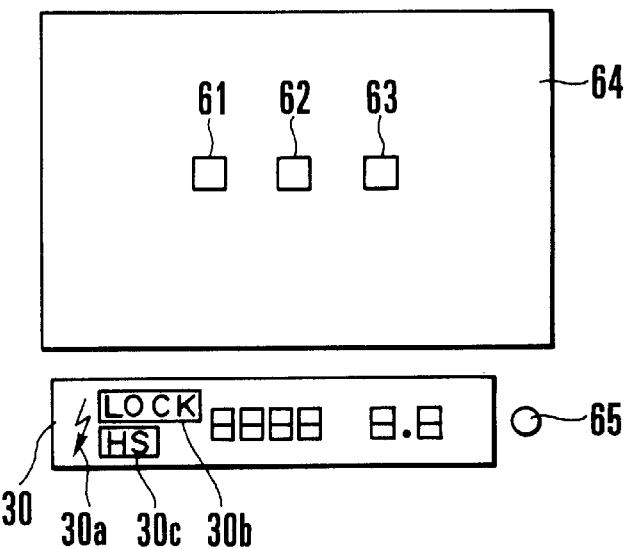
FIGS. 2(A), 2(B) and 2(C) show the inside of a viewfinder, areas of a light measuring sensor and areas of an AF sensor of the camera shown in FIG. 1.

FIG. 2(A) shows the internal layout of the viewfinder 64. As shown, distance measuring points 61, 62 and 63 are arranged to be displayed in a superimposed state respectively at left, middle and right parts within the viewfinder 64. An LED 65 (light emitting diode) is arranged to light up when an in-focus state is obtained. The LCD display device 30 which is also shown in FIG. 1 is arranged within the viewfinder to display a shutter time and an aperture value in seven segments and also to display a mark 30a indicating completion of a process of charging the flash device, a mark "LOCK" 30b indicating an FELK mode and a mark "HS" indicating a high-speed synchronizing state.

Figure 2B:
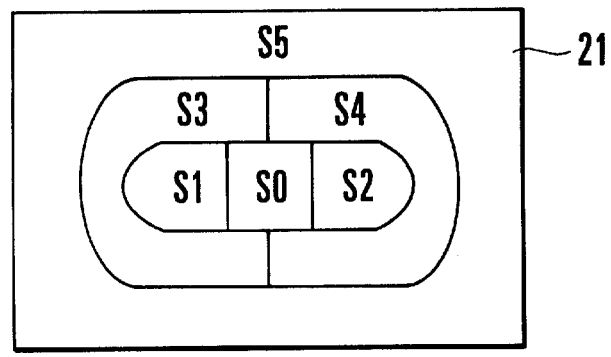

FIG. 2(B) shows the arrangement of areas of the light measuring sensor 21. As shown, the light measuring sensor 21 is divided into six light measuring areas S0 to S5. Of these split light measuring areas, the areas S0, S1 and S2 correspond respectively to the positions of the above-stated distance measuring points 62, 61 and 63.

Figure 2C:
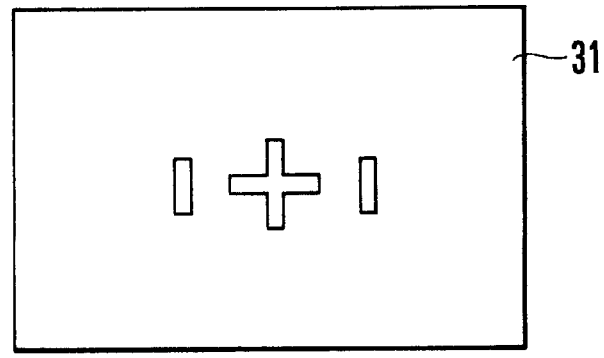

FIG. 2(C) shows the arrangement of areas of the AF sensor 31.

Figure 3:
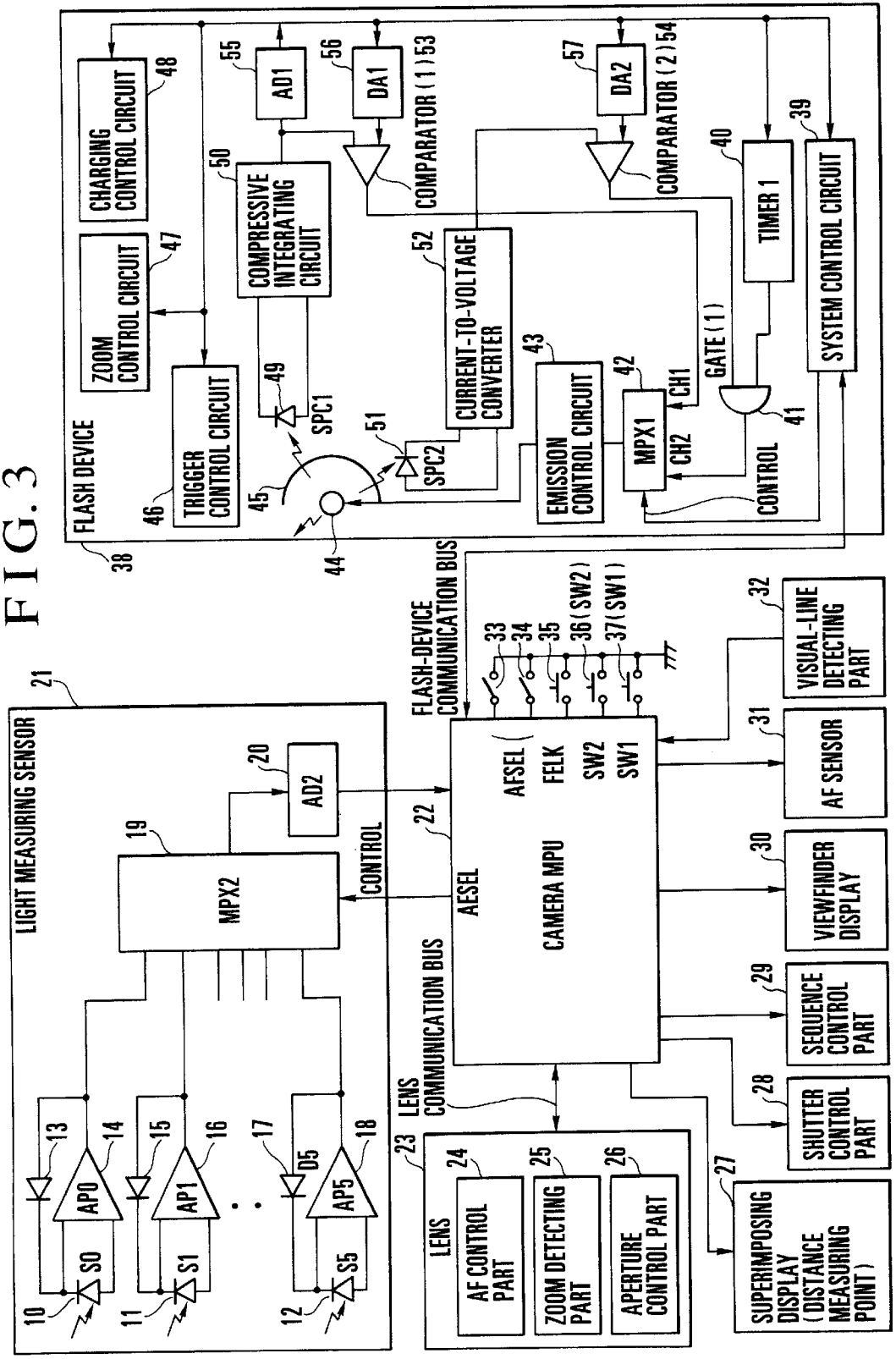
FIG. 3 is a block diagram showing the electrical arrangement of the camera, etc., shown in FIG. 1.

FIG. 3 is a block diagram showing the electrical arrangement of the camera, the lens and the flash device of the flash photography system.

Referring to FIG. 3, the split light measuring sensor 21 includes a signal processing part arranged to form a light measurement signal and, as shown also in FIG. 2(B), has a split light measuring area 10 (S0) which is located in the central part, a split light measuring area 11 (S1) located on the left side, a split light measuring area 12 located in the peripheral part, etc. In the split light measuring sensor 21, a compression diode (D0) 13 is arranged to current-to-voltage convert a photoelectric current of the split light measuring area S0 in conjunction with an operational amplifier (AP0) 14 while logarithmically compressing the photoelectric current. Compression diodes (D1 to D5) 15 to 17 and operational amplifiers (AP1 to AP5) 16 to 18 are likewise arranged to current-to-voltage convert the photoelectric currents of the other split light measuring areas S1 to S5 while logarithmically compressing them.

The current-to-voltage conversion outputs thus obtained are supplied to a multiplexer (MPX2) 19. Then, one of the light measurement signals of the split light measuring areas S0 to S5 is selected according to a selection signal AESEL coming from an MPU 22 of the camera. The light measurement signal thus selected is converted into a digital measured light value by an A/D converter (AD2) 20. The digital measured light value is taken into the MPU 22 of the camera.

The interchangeable lens 23 is provided with an AF control part 24 for focusing, a zoom detecting part 25 and an aperture control part 26 and is connected to the MPU 22 of the camera through a lens communication bus.

On the side of the camera, there are provided the display device 27 for displaying a distance measuring point in a superimposed manner, a shutter control part 28, a sequence control part 29, the viewfinder display device 30, the AF sensor 31, the visual-line detecting part 32, a light measuring switch (SW1) 37, a shutter release switch (SW2) 36, an FELK button 35, and distance measuring point selecting (AFSEL) switches 33 and 34. The AFSEL inputs to the MPU 22 of the camera are arranged to be at any of values "0" to "3" according to the states of the distance measuring point selecting switches 33 and 34.

The flash device 38 is connected to the camera through a flash-device communication bus.

Figure 5:
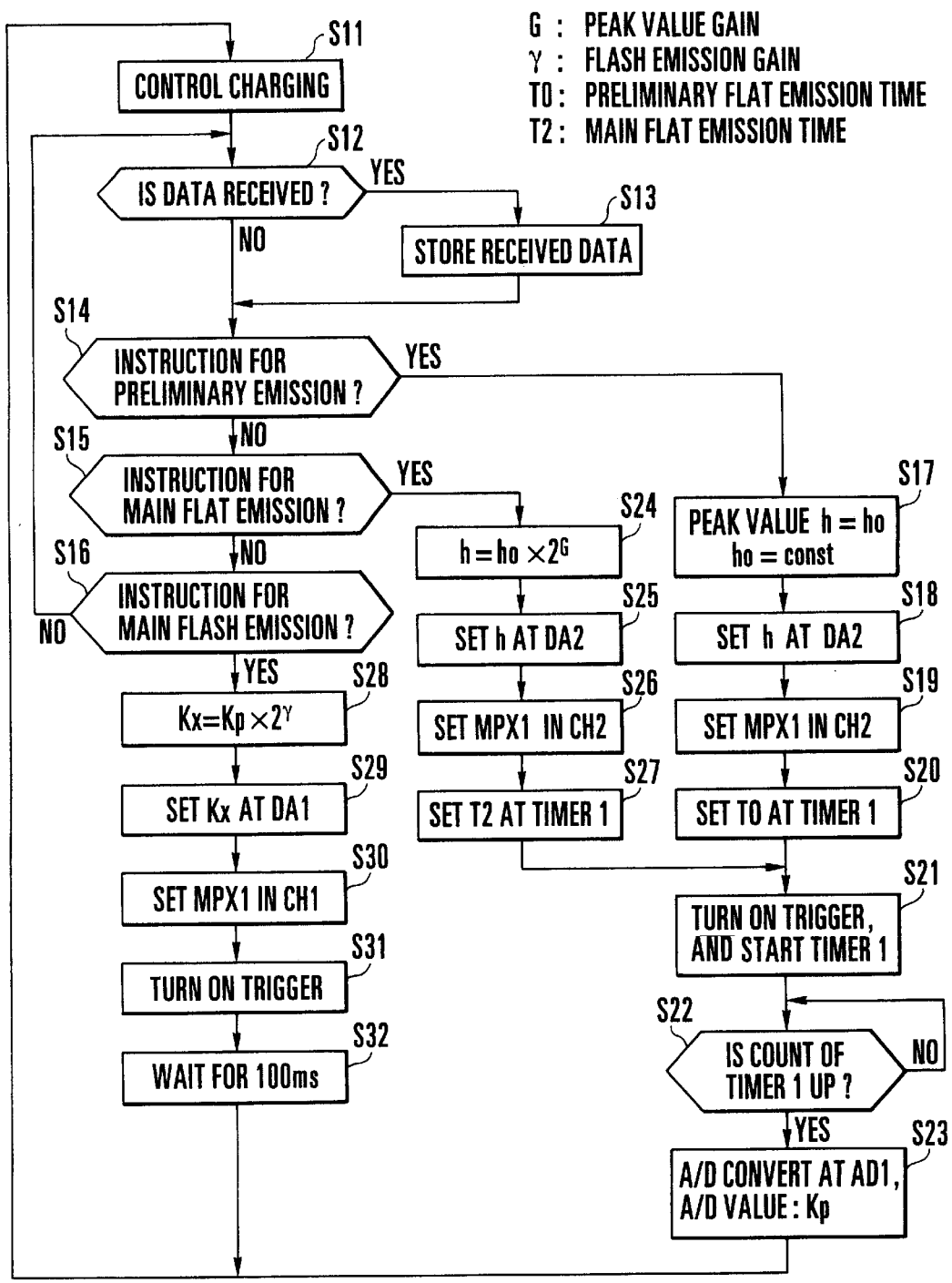
FIG. 5 is a flow chart showing actions of the embodiment executed in controlling a flash device.

The flash device 38 includes a system control circuit 39 which is arranged to execute a sequence of flash-device control actions which will be described later with reference to FIG. 5. The flash device 38 is further provided with a xenon lamp 44, a reflection shade 45, a trigger control circuit 46, a charging control circuit 48, a zoom control circuit 47, and an emission control circuit 43 such as an IGBT. In the flash device 38, the silicon photodiode (SPC1) 49 is arranged to directly receive a light emitted from the xenon lamp 44. A signal outputted from the silicon photodiode 49 is integrated by a compressive integrating circuit 50. The integral value thus obtained is read out by the system control circuit 39 through an A/D converter (AD1) 55 and is compared by a comparator (1) 53 with the output voltage of a D/A converter (DA1) 56. When the integral value reaches the output voltage of the D/A converter 56, light emission from the flash device is brought to a stop. In other words, a so-called light emission control can be performed.

When flat emission is to be made, the photoelectric current of the silicon photodiode (SPC2) 51 is converted by the current-to-voltage converter 52 into an output voltage which corresponds to the intensity of light emission. Then, the output voltage is compared by a comparator (2) 54 with the level of a D/A converter (DA2) 57. The light emission is brought to a stop when the output voltage comes to exceed the level of the D/A converter (DA2) 57 and is caused to continue again when the output voltage becomes lower than the level of the D/A converter 57, so that the flat emission can be maintained.

Since a logical product is obtained by means of an AND gate (1) 41 from the output of a timer (1) 40 and that of the above-stated comparator (2) 54, the flat emission continues until the timer (1) 40 comes to count up. A multiplexer (MPX1) 42 has two channels CH1 and CH2 the use of which is arranged to be changed from one over to the other by the system control circuit 39. More specifically, the system control circuit 39 is arranged to select the channel CH1 in making flash emission and the other channel CH2 in making flat emission.

Figure 4:
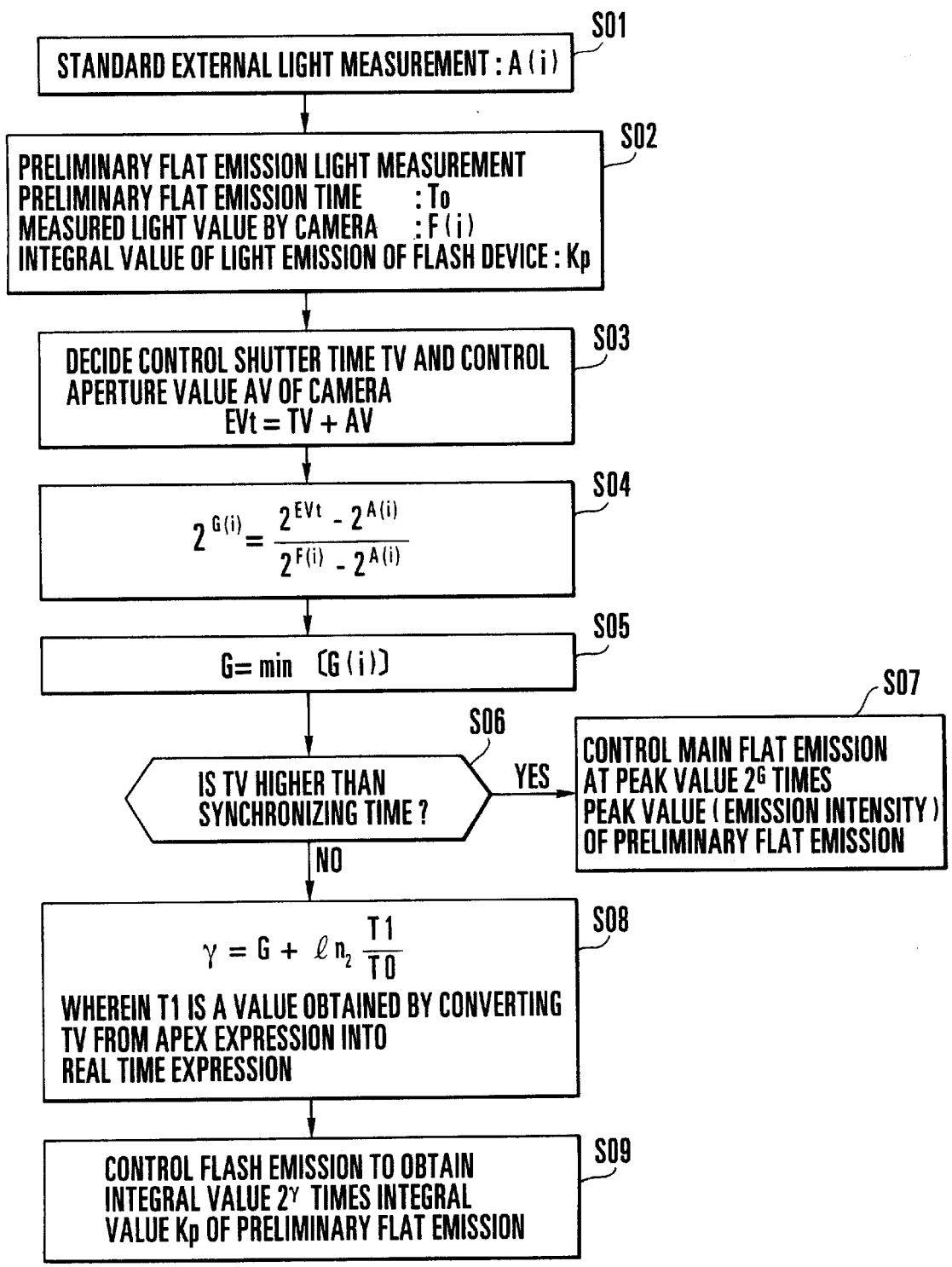
FIG. 4 is a flow chart showing actions of the embodiment of the invention executed in controlling main emission through preliminary emission.

FIG. 4 plainly shows in a flow chart the basic concept of an operation of a main emission control system using preliminary emission.

Referring to FIG. 4, a step S01 is arranged to carry out a normal external light measuring action. A measured light value thus obtained is expressed as A(i), wherein "i" represents one of values 0 to 5. The value "i" corresponds to the split light measuring areas S0 to S5. More specifically, "i" is 0 in the case of the area S0 and is 5 in the case of the area S5, and the measured values of external light at the respective areas S0 to S5 are expressed as A(0) to A(5). A next step S02 is provided for measuring light by making preliminary flat emission. A reflected light coming from an object of shooting as a result of the preliminary flat emission is measured at each of the above-stated areas. The measured value of light thus obtained is assumed to be F(i). At a step S03, a control value EVt of the camera is obtained from a control shutter time TV and a control aperture value AV. This value EVt may be obtained either as a value corresponding to the above-stated measured light value A(i) or as a computed value obtained from values TV and AV to be actually employed at the time of photographing, i.e., EVt=AV+TV.

A step S04 is a computing step which is the nucleus of the present control operation. In a formula shown at the step S04, information on how much the light measurement is influenced by the preliminary emission is extracted by the denominator "$2^{F(i)}-2^{A(i)}$" of the formula. Then, the numerator of the formula which is a necessary amount of influence is divided by the denominator. The computation is thus carried out in such a way as to find by how many times the peak value (emission intensity) of main emission must be higher than the peak value of the preliminary emission, for making the main emission apposite to each of the split light measuring areas. The result of the computing operation for each of the light measuring areas can be expressed as $2^{G(i)}$.

In a case where the measured value of external light A(i) is found to be extremely smaller than the control value EVt according to the above-stated formula, it is possible to express this state as "G(i)=EVt−F(i). In that case, the measured light value F(i) obtained by preliminary emission of course must be relatively larger than the measured external light value A(i).

Assuming that the measured light value F(i) obtained by preliminary emission is at a value EV13 when the measured external light value is extremely smaller than the control value EVt, if, for example, the control value EVt is 11 (at a shutter time value 1/60 sec and an aperture value F5.6), the value G(i) becomes "G(i)=11−13=−2" at the time of main emission. Therefore, an exposure then can be appositely carried out at the control value EVt=11, by controlling the main emission with a peak value which is smaller by two steps than the peak value (emission intensity) of the preliminary emission.

At a step S05, the light emission of the flash device is controlled with priority given to an object located near to the camera by extracting the smallest of the values of the flat emission gain G(i) obtained from the split light measuring areas.

Generally, in flash photography, a main object of shooting is widely located in the central part and appears nearest in the frame of a picture to be taken. In view of this, the algorithm described above is employed as a sort of evaluative light emission control. It is also conceivable to make selection by weighting the central area in addition to the simple selection of the smallest value. Further, there is a problem that, in a case where a main object is located, for example, in the rear of a white table cloth or the like, the image of the main object tends to be controlled for an underexposure. The algorithm, therefore, still remains to be improved with respect to such a problem. However, the algorithm which gives priority to a near object is basically applied to the evaluative light emission control described.

At a next step S06, a check is made to find if the control shutter time TV is a higher speed than the synchronizing shutter time. If so, the flow of operation comes to a step S07 to have the main emission made as flat emission.

At the step S07, the main emission is controlled at a light emitting intensity value (peak value) which is larger by G steps than the peak value of the preliminary emission. Under such control, an exposure can be appositely effected. In this instance, the emission time must be arranged to continue from a point of time at which the leading shutter curtain begins to open until the aperture of the lens is completely covered by the trailing shutter curtain.

If the control shutter time TV is found at step S06 to be slower than or equal to the synchronizing shutter time (speed), the flow comes to a step S08. At the step S08, a computing operation is performed according to a formula shown at the step S08 to obtain the integral gain γ of main flash emission.

The film can be adequately exposed at the step S07 by using a total of light passing through the slit of the shutter at the intensity of the main flat emission. Therefore, with the integral value of the light emitted by the flash device for the period of the preliminary emission time T0 and measured at the step S02 assumed to be Kp, the peak value of the preliminary flat emission becomes [Kp/T0]. Since the necessary peak value is [(Kp/T0)×$2^G$], with the control shutter time assumed to be T1, the total amount of emission can be expressed as [(Kp/T0)×$2^G$T1]. Therefore, the flash device 38 is instructed to use the integral gain γ of main flash emission obtained at the step S08. Then, at a next step S09, on the side of the flash device 38, the main flash emission is controlled with an integral value of main emission which is $2^γ$ times as much as the integral value Kp of the preliminary emission.

As described above, the light of preliminary flat emission is measured and the total amount of this preliminary emission is measured also on the side of the flash device 38. At the time of main emission, the flash device 38 is controlled at a value which is $2^G$ times as much as the peak value of the preliminary emission in the case of a slit-exposure shutter time or at a value which is $2^γ$ times as much as an integral value of the preliminary emission in the case of a flash-emission shutter time. The light of the flash device 38 thus can be consistently controlled.

Before description of a flow of a sequence of actions of the camera, a flow of a sequence of actions of the system control circuit 39 disposed within the flash device 38 is described below with reference to FIG. 5. The following description will be more clearly understood with reference to the circuit block of the flash device 38 shown in FIG. 3.

Within the flash device 38, the system control circuit 39 which is, for example, a microcomputer is arranged to control the communication and the sequence of actions to be performed within the flash device 38. At a step S11 of FIG. 5, a charging action is controlled. More specifically, a battery voltage is boosted to charge a main capacitor which is not shown up to 300 V or thereabout. The charging control is executed by the charging control circuit 48 which is shown in FIG. 3.

At a next step S12, the flow of operation waits for data sent from the camera. Upon receipt of data, the flow comes to a step S13. At the step S13, the data received are stored as variables indicating respectively a peak value gain G, a flash emission gain γ, a preliminary flat emission time T0 and a main flat emission time T2. Next, at a step S14, a check is made for an instruction from the camera for preliminary emission. At a step S15, a check is made for an instruction from the camera for main flat emission. At a step S16, a check is made for an instruction from the camera for main flash emission. These steps S14, S15 and S16 are repeated in a loop-like manner until receipt of data is found at the step S12.

At the step S14, when the instruction for preliminary emission is received, the flow comes to a step S17. At the step S17, a predetermined peak value (intensity of emission) $h_o$ is substituted for a peak value h. At a step S18, the substitute peak value is set at the D/A converter (DA2) 57. At a step S19, the multiplexer (MPX1) 42 is set at the channel CH2 for flat emission. At a step S20, the emission time T0 is set at a timer (1) 40. At a step S21, the trigger control circuit 46 is turned on to start the timer (1) 40.

With the trigger control circuit 46 turned on, the xenon lamp 44 begins to emit light. The state of the light emission is monitored by the silicon photodiode (SPC2) 51. When the output of the silicon photodiode (SPC2) 51 which shows the peak value (intensity) of the light emission becomes larger than the peak value $h_0$ set at the D/A converter (DA2) 57, the level of the output of the comparator (2) 54 becomes high. In response to the high level output of the comparator (2) 54, the emission control circuit 43 turns off the xenon lamp 44 to suspend its light emission. When, as a result, the output of the silicon photodiode (SPC2) 51 drops and the peak value becomes lower than the peak value $h_0$, the level of the output of the comparator (2) 54 becomes low. As a result, the emission control circuit 43 causes the xenon lamp 44 to resume light emission. The flat emission thus can be stably maintained. This light emission comes to an end when the time count by the timer (1) 40 comes to an end.

At a step S22, the flow of operation waits for the end of the count by the timer (1) 40. The flow comes to a step S23 when the count comes to an end. At the step S23, the A/D converter (AD1) 55 is caused to A/D convert the integral value of the preliminary flat emission. A digital value thus obtained is stored as the value Kp. The flow then comes back to the step S11.

When the system control circuit 39 receives the instruction for main flat emission from the camera at the step S15, the flow comes to a step S24. At the step S24, a value which is the gain value $2^G$ times the peak value $h_0$ of the preliminary emission is computed. At a step S25, the result of computation is set at the D/A converter (DA2) 57. At a step S26, the flat emission is selected by setting the multiplexer (MPX1) 42 at the channel 2. At a step S27, a main flat emission time value T2 is set at the timer (1) 40. Then, the flow comes to the step S21 to execute the steps S21, S22 and S23 for carrying out flat emission.

When the system control circuit 39 receives the instruction for main flash emission from the camera at the step S16, the flow comes to a step S28. At the step S28, an integral value Kx which corresponds to a value $2^\gamma$ times as much as the integral value Kp of the preliminary emission is computed. At a step S29, the value Kx is set at the D/A converter (DA1) 56. At a step S30, the multiplexer (MPX1) 42 is set at the channel CH1. At a step S31, the trigger control circuit 46 is turned on.

The trigger control circuit 46 then causes the xenon lamp 44 to begin to emit a flash light. The amount of light thus obtained is photo-electric converted by the silicon photodiode (SPC1) 49 and is integrated by the compressive integrating circuit 50. When the amount of integration reaches the value Kx set at the D/A converter (DA1) 56, the result of comparison by the comparator (1) 53 reverses to terminate flash emission.

At a step S32, since the maximum time of 100 ms is long enough before flash emission comes to an end, the flow of operation waits for 100 ms. Incidentally, the flow may come back to the step S11 after waiting for the output of the comparator (1) 53 to reverse.

Figure 18:
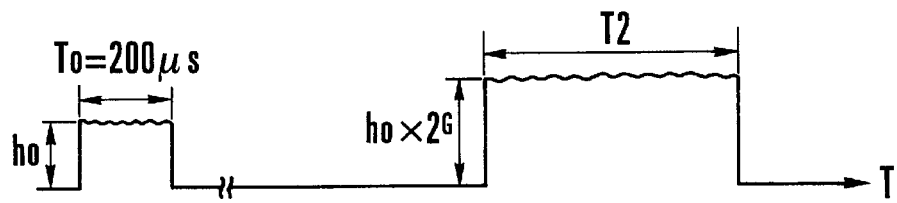
FIGS. 18(A), 18(B), 18(C) and 18(D) are waveform charts showing preliminary emission and main emission performed in accordance with this invention.
Figure 18:
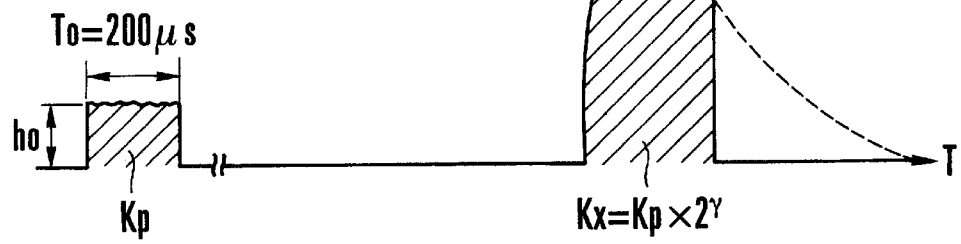
Figure 18:
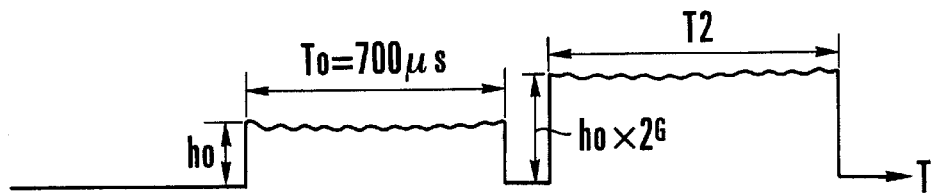
Figure 18:
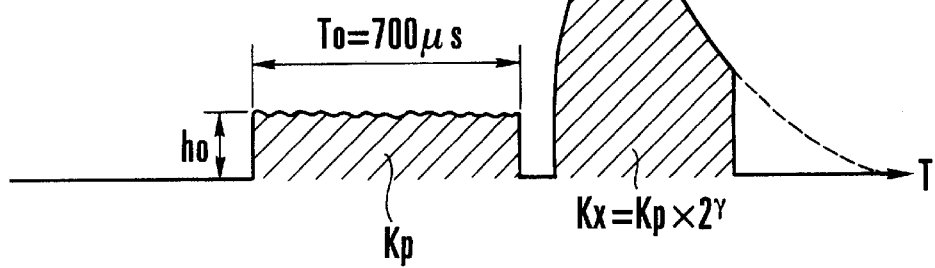

Referring to FIGS. 18(A) to 18(D), at the time of preliminary emission, the flash device 38 receives data of emission intensity h0 and emission time T0 from the camera and makes flat emission at the emission intensity h0 for the period of the emission time T0. In making the main flat emission, as shown in FIGS. 18(A) and 18(C), the flash device 38 receives data of the gain G and the emission time T2 from the camera and makes flat emission at the emission intensity $h0 \times 2^G$ for the period of emission time T2. Further, in the case of main flash emission, as shown in FIGS. 18(B) and 18(D), the flash device 38 makes flash emission at a flash integral amount $Kp \times 2^\gamma$ on the basis of the integral value Kp of the preliminary flat emission and according to a gain γ designated by the camera.

Figure 6:
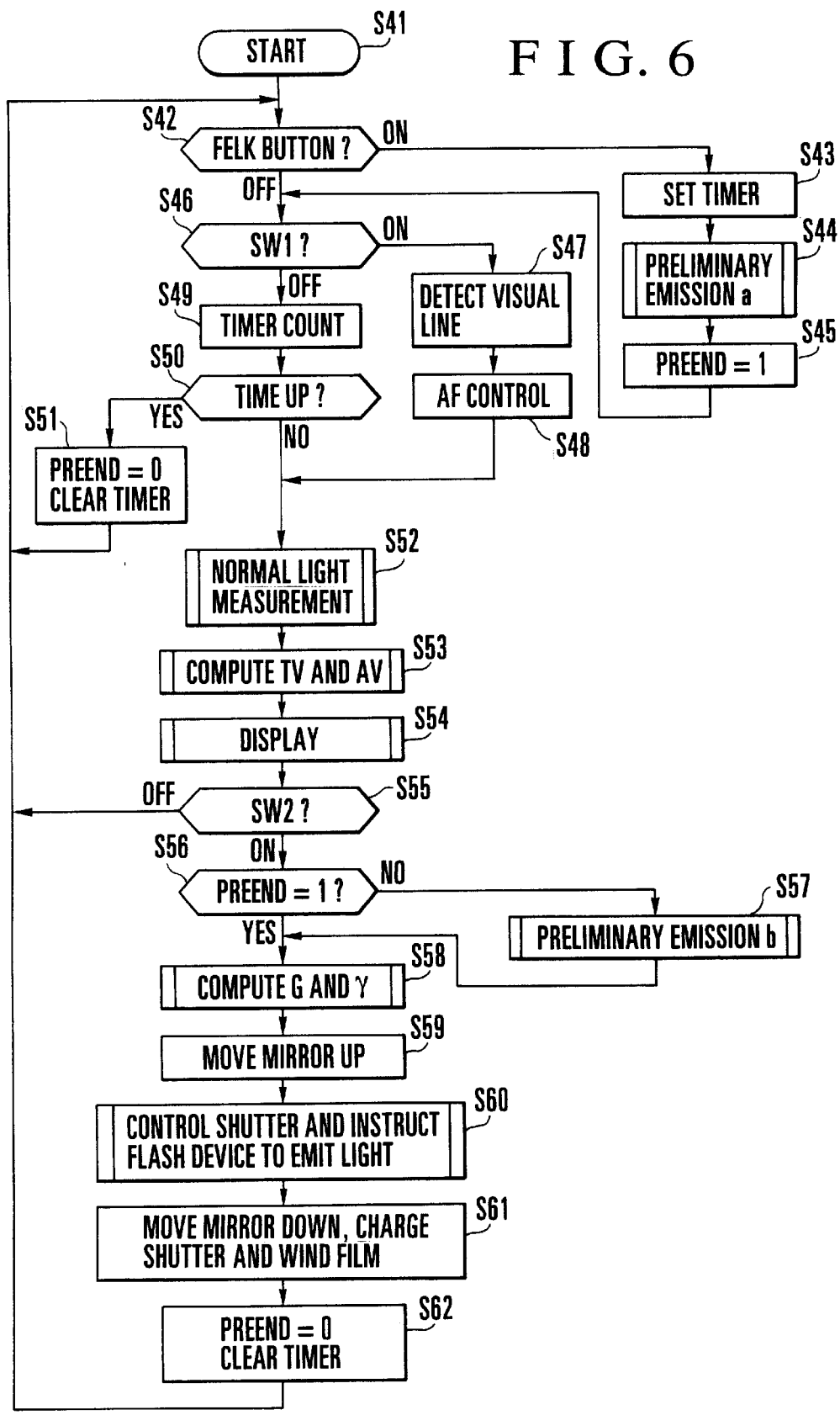
FIG. 6 is a flow chart showing main actions of the camera of the embodiment of the invention.

FIG. 6 is a flow chart showing the main sequence of actions of the camera.

At a step S41 of FIG. 6, the flow of operation starts. At a step S42, a check is made to find if the FELK button 35 is pushed. If so, the flow comes to a step S43. If not, the flow comes to a step S46.

The term FELK means an action for the flash device similar to the so-called AE lock. When the FELK button 35 is pushed, the flash device 38 is caused to make preliminary emission. The amount of light to be emitted by the flash device at the time of shutter release is determined on the basis of an amount of a reflected light resulting from the preliminary emission. For improvement in operability, this action is preferably carried out for a relatively narrow area like in the case of partial light measurement.

Therefore, with an object of shooting for which it is desired to appositely make an exposure with the flash device placed at a distance measuring point or the like, the preliminary emission is caused by pushing the FELK button 35. Unlike the conventional method of TTL light control, the method permits an apposite exposure, even in the event of, for example, a change in framing, because the exposure is based of the information on the distance to the main object and the reflection factor obtained by measuring a reflected light resulting from the preliminary emission.

At the step S43, in order to give a temporal room for a change of framing or the like, a timer which measures time while the FELK action is in process is set in such a way as to extend the time count. At a step S44, a mode of preliminary emission called preliminary emission "a" is called. In another mode called preliminary emission "b" which appears later at a step S57, light is measured for evaluative light control by using almost all the split light measuring areas. In the case of the preliminary emission "a", on the other hand, a narrow partial light measuring area interlocked with a distance measuring point or the like is preferably used for improvement in operability. In this case, therefore, the preliminary flat emission time is arranged to be much shorter than the preliminary emission "b", so that electric energy can be saved from being wasted.

At a step S45, a flag PREEND which indicates the state of the FELK action is set at "1".

At the step S46, a check is made to find if the light measuring switch (SW1) 37 is pushed by the first stroke of operation on the shutter release button. If so, the flow comes to a step S47 to detect the visual line of the operator. Then, in a case where the AFSEL input switches 33 and 34 provided for selection of a distance measuring point are at any of positions "0" to "2", they indicate selection of arbitrary distance measuring points including middle, left and right points. In that case, the visual-line detection is not made and the flow immediately comes to a step S48. At the step S48, AF control is performed on the basis of the distance measuring point. Further, in a case where the AFSEL switches 33 and 34 are at a position "3" [AFSEL=3], the AF control is performed on the basis of a distance measuring point selected according to the result of visual-line detection.

If the light measuring switch SW1 is found to be in an off-state at the step S46, the flow comes to a step S49. At the step S49, the light measuring timer is caused to count time. At a step S50, if the time count is found to be up, the flow comes to a step S51. At the step S51, the flag PREEND which indicates that the FELK action is in process is cleared to "0". The flow then comes back to the step S41.

If the AF control is finished either at the step S48 or while the light measuring timer is found to be still counting, the flow comes to a step S52 to measure light in a normal manner. At a step S53, a shutter time TV and an aperture value AV are decided according to the result of evaluative light measurement, a program chart or the like on the basis of the measured value of light obtained at the step S52. At a step S54, a display is made.

At a step S55, a check is made for the state of the release switch SW2. If the switch SW2 is found to be in an off-state, the flow comes back to the step S42 to repeat the steps described above. If the switch SW2 is found to be in an on-state, i.e., if the shutter release button is operated to its second stroke position, the flow comes to a step S56 for a sequence of release actions.

At the step S56, a check is made to find if the flag PREEND is at "1" thus indicating the mode of FELK. If so, the flow comes to a step S58 for gain computation. If not, the flow comes to a step S57 to make the preliminary emission "b" before moving up a mirror. Since the preliminary emission "b" is to be followed by the main emission, it is called "batch emission".

At the step S58, in obtaining the gains G and γ, gains corresponding to one light measuring area and to a plurality of light measuring areas are computed by making the FELK action or the batch emission. Further, depending on whether the shutter time (speed) is faster than a synchronizing shutter time, i.e., a maximum speed for fully opening the shutter, the gain G for the flat emission or the gain γ for the flash emission is obtained.

At a step S59, the main mirror 3 is moved up. At a step S60, the shutter is controlled. Then, at the same time, data and instructions of varied kinds are sent to the flash device 38 for light emission.

At a step S61, the mirror is moved down, the shutter is charged, and a film winding action is performed. At a step S62, the flag PREEND which indicates that the FELK action is in process is cleared to "0", and the flow comes back to the step S42.

Each of subroutines of the flow of operation described above is next described below.

Figure 7:
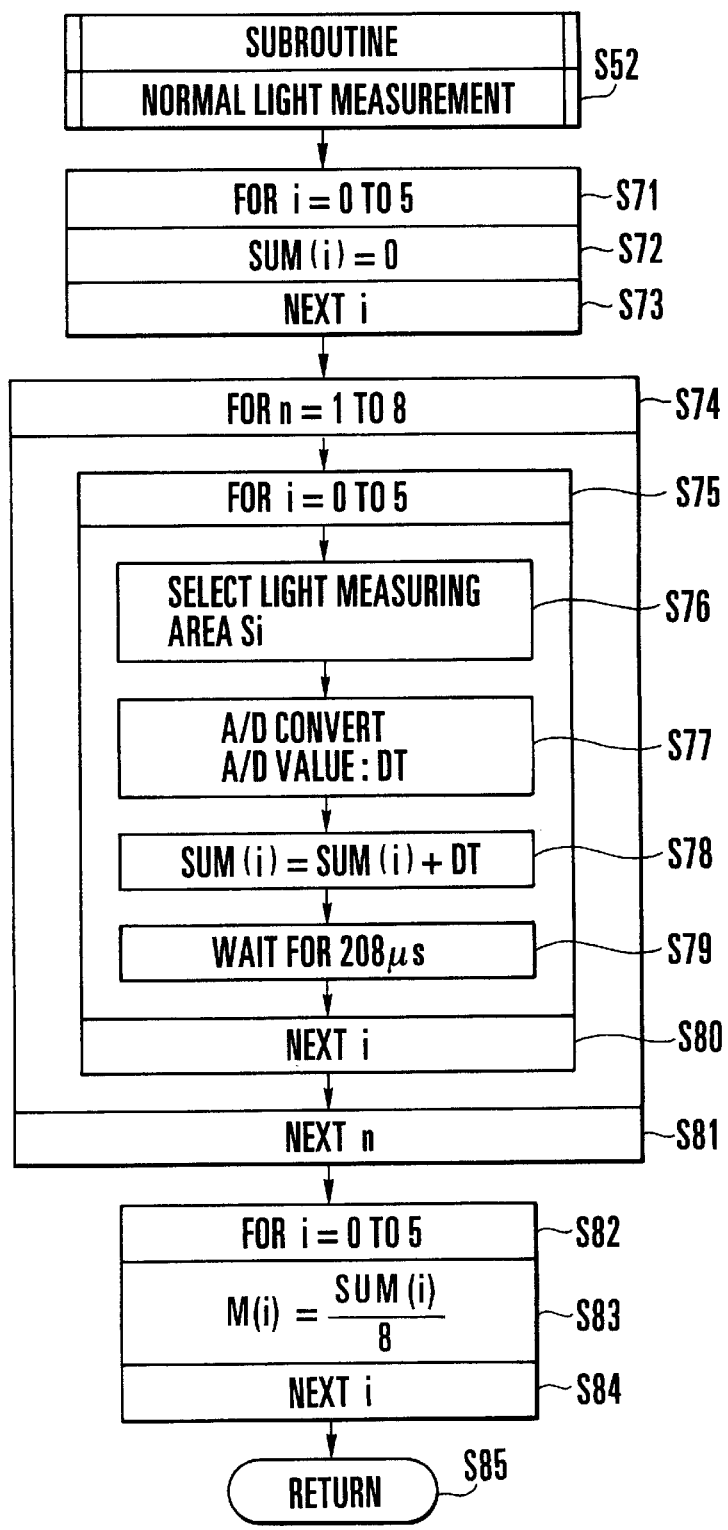
FIG. 7 is a flow chart showing a subroutine of normal light measurement executed in the flow of operation of FIG. 6.

FIG. 7 shows the subroutine to be executed for normal light measurement at the step S52 of FIG. 6. In this subroutine, to mitigate the adverse effect of flicker of light such as the light of a fluorescent lamp, light is measured in an averaging manner over a period of about 10 ms. There are a total of six light measuring areas i including areas 0 to 5 in this case. A/D converting action is repeated eight times and the results of A/D conversion are averaged for each of these light measuring areas. Since the sampling action for light measurement is preferably dispersed as much as possible over the period of 10 ms for a better result of averaging, the light measuring areas are changed from one over to another at a step S76 for a duplex loop of steps S74 and S75. As a result, the A/D conversion is performed a total of 48 times (6×8) during the period of 10 ms. At a step S79, a weight of [10 ms÷48 times=208 μs] is attained.

If a length of time required in executing the steps S74 to S81 (excluding the step S79) is excessively long, an excess should be subtracted beforehand from the value of 208 μs.

At steps S71 to S73, a variable of each of the light measuring areas i (i: 0 to 5) expressed as SUM(i) is first cleared to "0". At the step S76, a light measuring area is selected. At the step S77, an output for the selected area is A/D converted. At the step S78, a sum of values obtained for each light measuring area is added to the value SUM(i). This action is repeated 48 times during the period of 10 ms by the duplex loop. The outputs for the light measuring areas i (i=0 to 5) are serially A/D converted one after another. The A/D conversion is repeated eight times. Then, the variable SUM (i) for each area comes to represent the result of the A/D conversion repeated eight times. After that, an average measured light value M(i) for each light measuring area is obtained at steps S82, S83 and S84. At a step S85, the flow comes back to the main routine.

Figure 8:
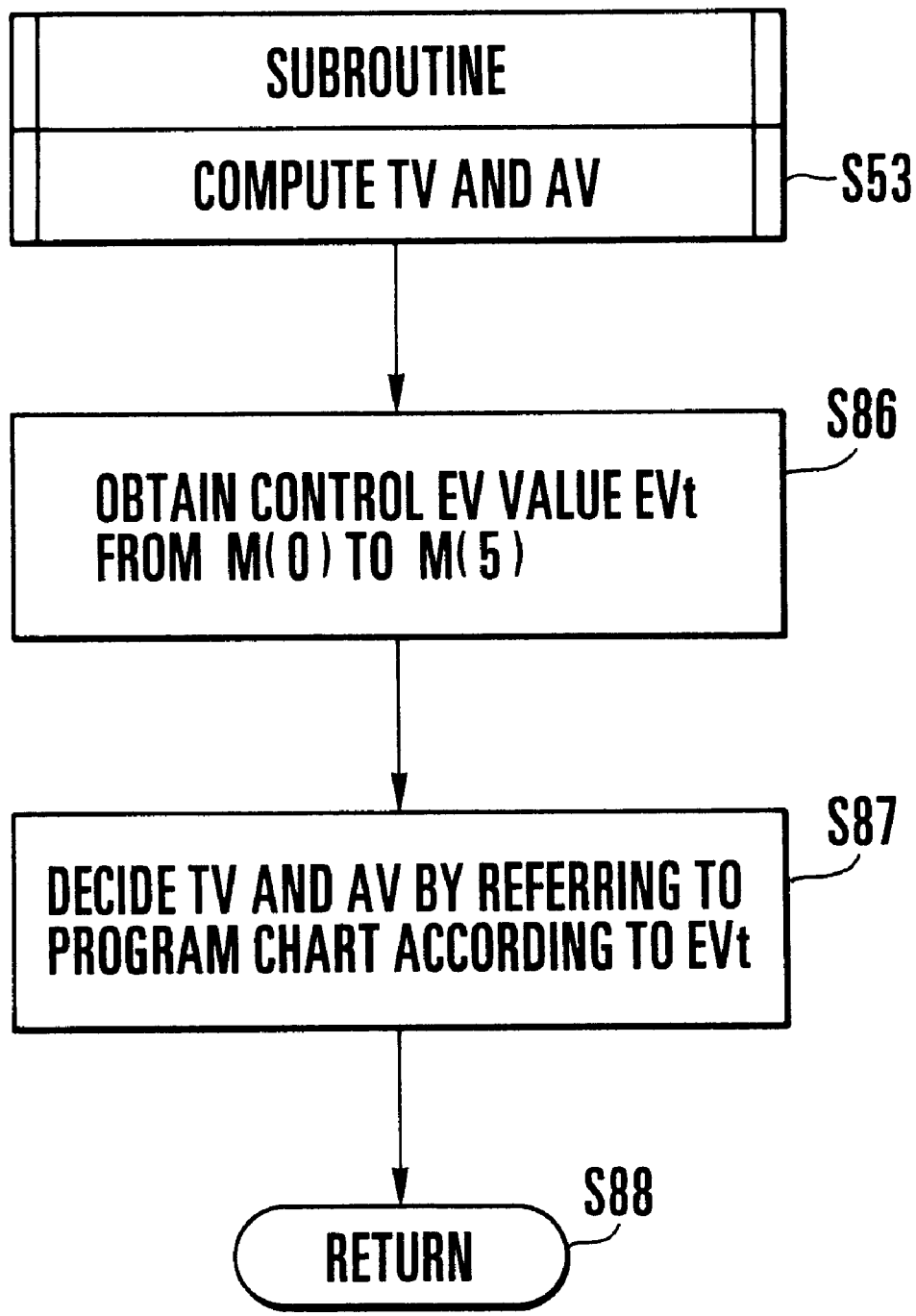
FIG. 8 is a flow chart showing a subroutine of computing TV and AV in the flow of operation of FIG. 6.

A subroutine of computing the values TV and AV to be executed at the step S53 of FIG. 6 is next described with reference to FIG. 8.

At a step S86, a control EV value EVt is obtained on the basis of the measured light value M(i). Generally, it is necessary to further process the measured light value with data for level and gain correction, temperature correction, correction of varied kinds for the full open aperture of the lens, ISO sensitivity SV, etc. However, these actions are well known and are not important points with regard to this embodiment of the invention. Therefore, these actions are assumed here to be automatically carried out by the action of the A/D converter (AD2) 20. Further, in obtaining the value EVt from the measured light values M(i) of the split light measuring areas, actions such as weighting some distance measuring point for evaluative light measurement, an evaluative computation according to information on backlight correction and the focal length of the lens, etc., may be carried out at the step S86.

At a step S87, the values TV and AV are obtained from a program chart on the basis of the control value EVt obtained at the step S87. In the case of a TV priority mode or an AV priority mode other than a program mode, one of the values TV and AV is set beforehand and the other is computed accordingly. At a step S88, the flow comes back to the main routine shown in FIG. 6.

Figure 9:
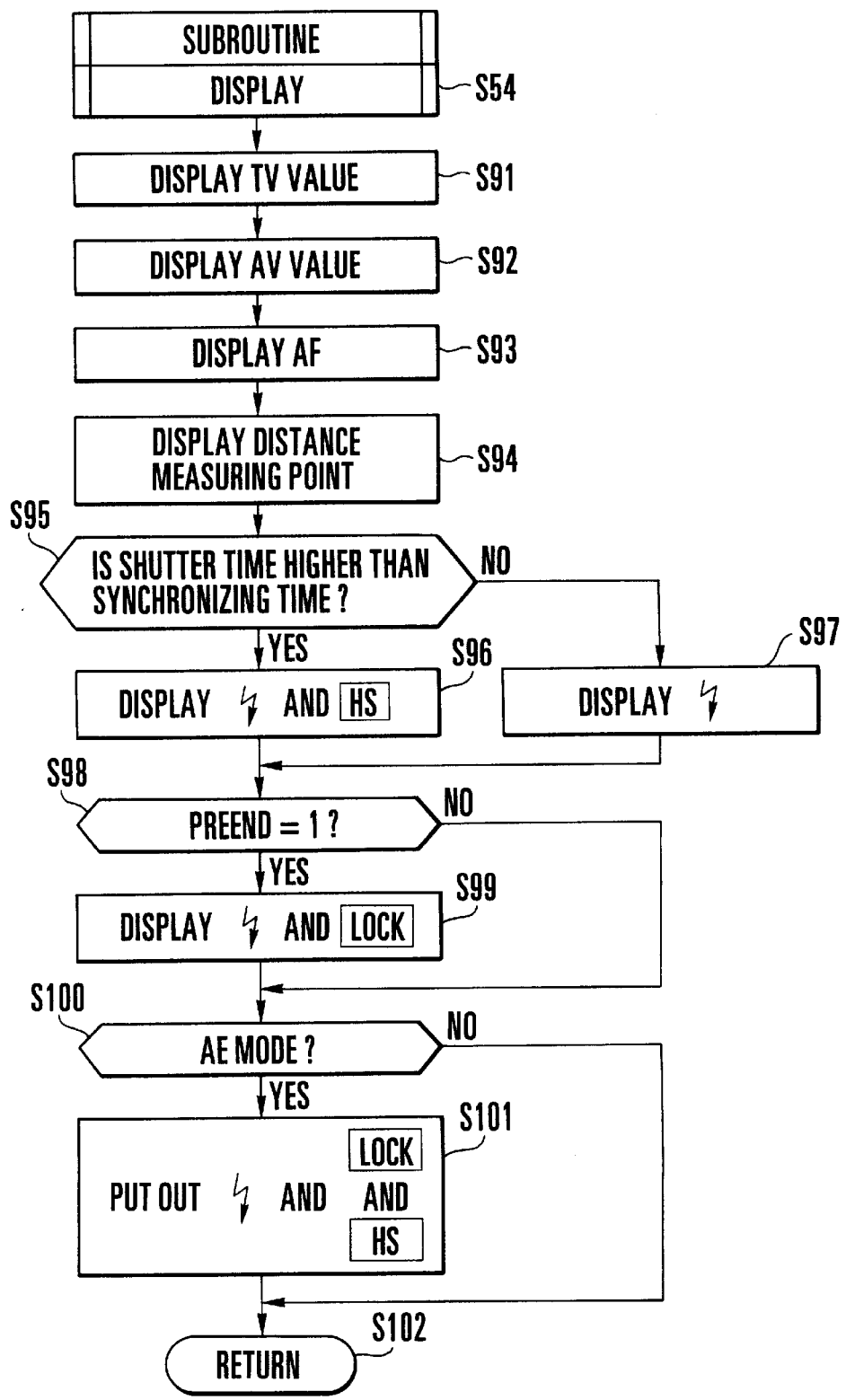
FIG. 9 is a flow chart showing a subroutine of making a display in the flow of operation of FIG. 6.

A subroutine for the display to be executed at the step S54 of FIG. 6 is next described with reference to FIG. 9.

At a step S91, the shutter time TV is displayed at the viewfinder display device 30. At a step S92, the aperture value AV is displayed. At a step S93, an AF display is made on the in-focus state displaying LED 65. At a step S94, the distance measuring point 61, 62 or 63 is displayed in a superimposed state. This display is made by selectively lighting up one of three parts of the LED 27 (shown in FIG. 1) in such a way as to light up one of the distance measuring points 61, 62 and 63.

At a step S95, a check is made to find if the shutter time TV decided at the step S87 is a speed higher than the synchronizing shutter time. If so, the flow comes to a step S96 to display a mark 30a which indicates completion of a charging action on the flash device and an HS mark 30c which indicates high-speed synchronization. If not, the flow comes to a step S97 to display only the flash-device charging completion mark 30a. At a step S98, a check is made to find if the flag PREEND is at "1" indicating that the camera is in the mode of FELK. Since the camera is in the FELK mode, the flow comes to a step S99. At the step S99, a LOCK mark 30b is added to the display.

At a step S100, a check is made for an AE mode. If the camera is in the AE mode, the flow comes to a step S101 to put out the display relative to the flash device. The flow then comes back at a step S102.

Figure 10:
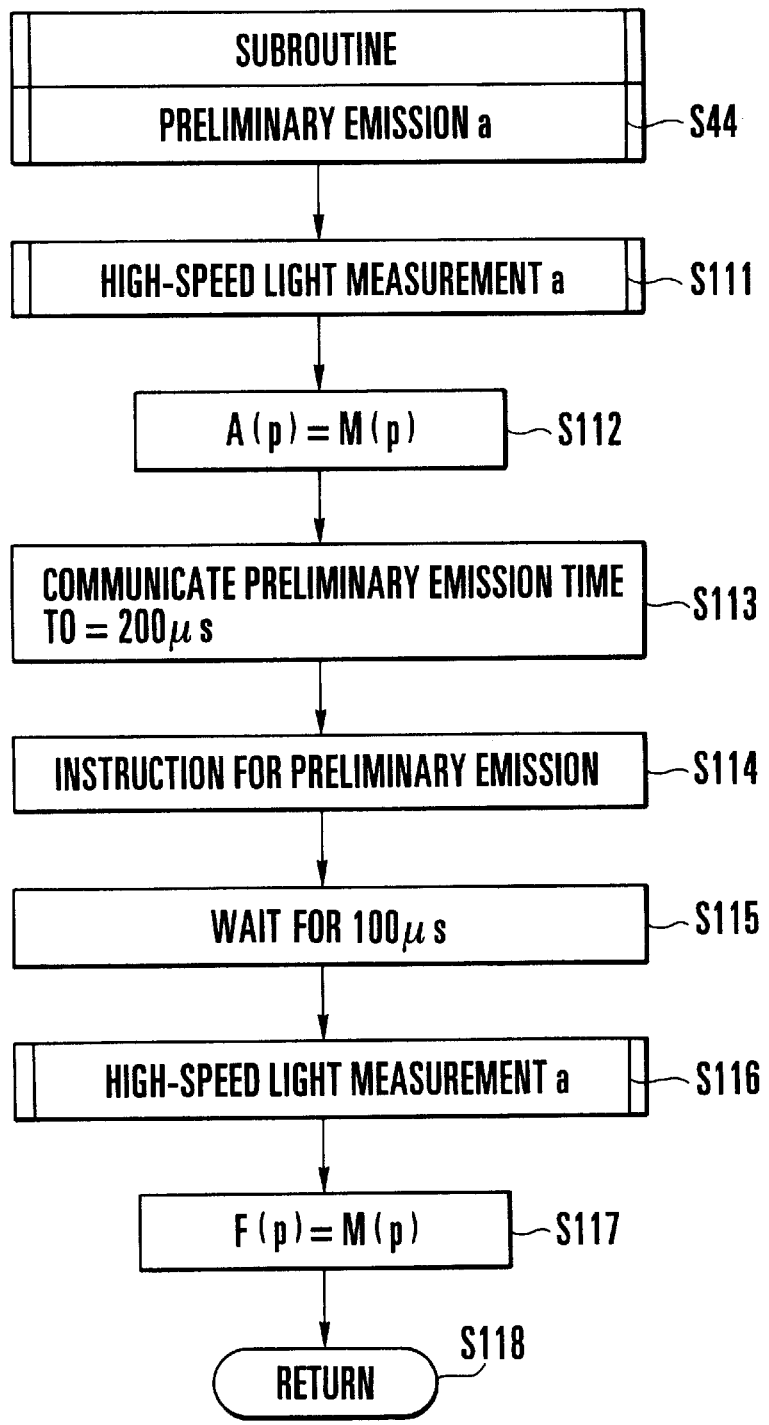
FIG. 10 is a flow chart showing a subroutine of preliminary emission "a" in the operation of FIG. 6.

A subroutine of the preliminary emission "a" to be executed at the step S44 of FIG. 6 is described with reference to FIG. 10.

The term "preliminary emission a" means preliminary emission to be made for the FELK action when the FELK button (switch) 35 is pushed.

Figure 11:
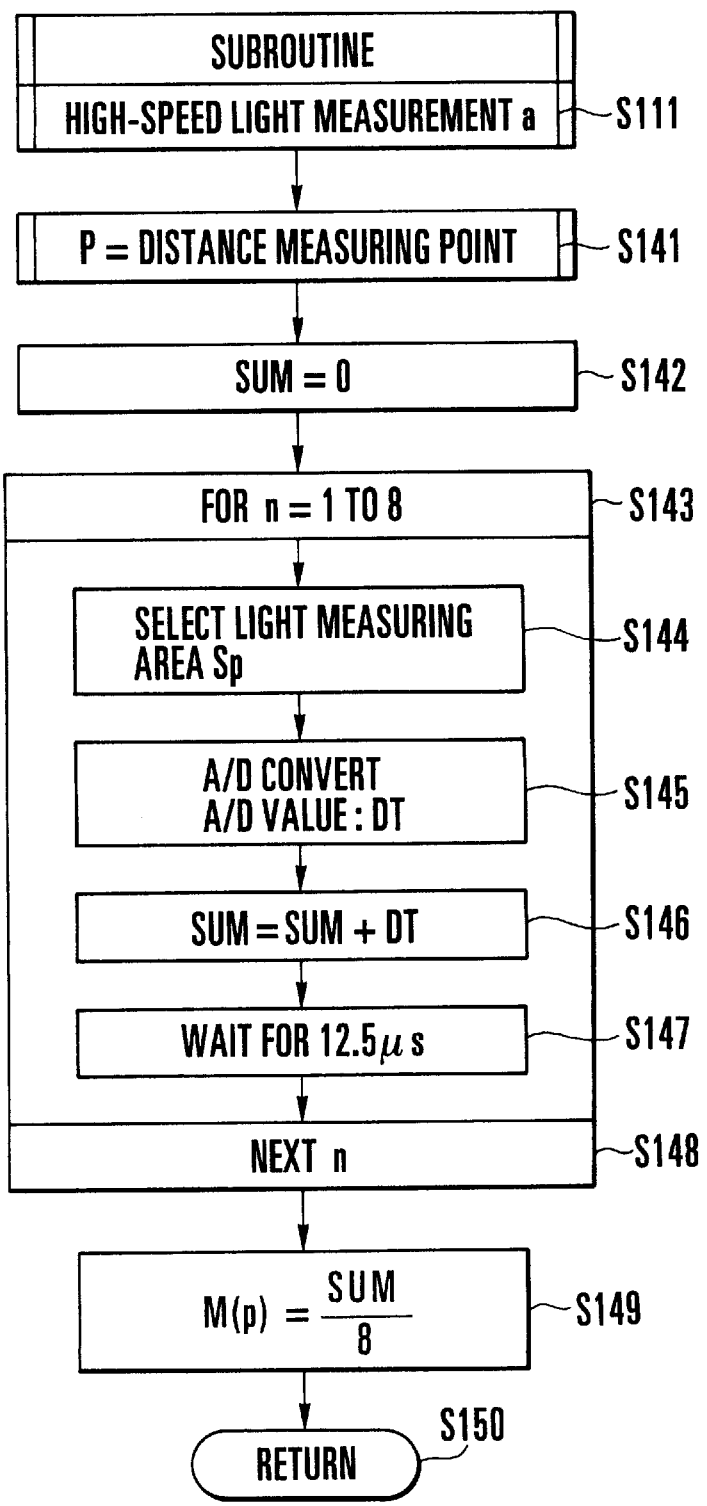
FIG. 11 is a flow chart showing a subroutine of high-speed light measurement "a" to be executed in the flow of operation shown in FIG. 10.

At a step S111, a high-speed light measurement "a" is performed. In performing the high-speed light measurement "a", a distance measuring point is first decided at a step S141 as shown in FIG. 11. A subroutine for deciding the distance measuring point is as described below with reference to FIG. 12.

Figure 12:
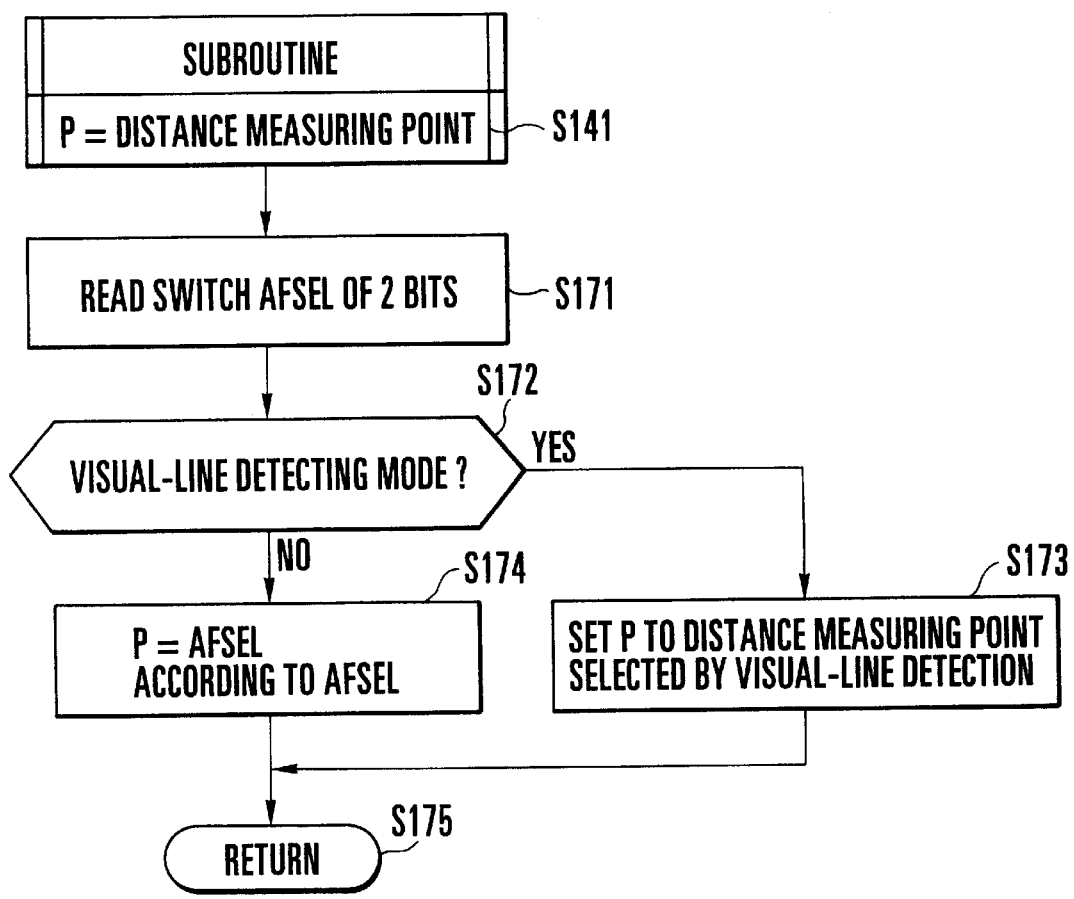
FIG. 12 is a flow chart showing a subroutine of selecting a distance measuring point to be executed in the flow of operation shown in FIG. 11.

Referring to FIG. 12, at a step S171, the position of the AFSEL switch of two bits is read. At a step S172, a check is made for a visual-line detecting mode. If the position of the AFSEL switch is "3" which indicates the visual-line detecting mode, the flow comes to a step S173. At the step S173, a distance measuring point found by detecting the visual line of the operator is assumed to be P. The default value of the distance measuring point P is "0", which indicates a central point. In a case where the position of the AFSEL switch is "0", "1" or "2", which indicates arbitrary selection of a distance measuring point, the flow comes to a step S174 to set the distance measuring point P at one of the arbitrary AFSEL positions. At a step S175, the flow comes back to the routine of FIG. 11.

Again referring to FIG. 11, with a distance measuring point decided in the manner described above, the light measuring operation is executed over a period of 100 $\mu$s at steps S143 to S148 with respect to the distance measuring point decided.

At a step S142, a variable SUM is set at "0". At a step S144, a light measuring area corresponding to the distance measuring point P is selected. At a step S145, the measured light value thus obtained is A/D converted. At a step S146, the digital data thus obtained is integrated. At a step S147, the flow waits for 12.5 $\mu$s. These actions are repeated eight times through the steps S143 and S148. At a next step S149, a measured light value M(P) is obtained by dividing the results of the steps S143 to S148 by eight. At a step S150, the flow comes back to the routine shown in FIG. 10.

Referring again to FIG. 10, upon return from the step S150 of FIG. 11 to the step S111, the flow comes to a step S112. At the step S112, the measured light value M(P) is stored as a normal measured external light value A(P). At a step S113, the preliminary emission time T0 is communicated as 200 $\mu$s.

At a step S114, an instruction for preliminary emission is sent to the flash device 38. The reason why the preliminary emission time T0 is set at 200 $\mu$s while the high-speed light measurement "a" requires only 100 $\mu$s lies in that the xenon lamp 44 of the flash device 38 is unstable for a while to make the peak value also unstable at the start of flat emission. Besides, an increase in photoelectric current causes the light measurement output value of the light measuring sensor to remain also unstable for a while in the initial stage of the output. To avoid the initial instability, a dummy wait time of 100 $\mu$s [200 $\mu$s−100 $\mu$s=100 $\mu$s] is provided at a step S115. Upon expiration of the dummy wait time, the flow comes to a step S116. At the step S116, the high-speed light measurement "a" is called to measure a reflected light of an object resulting from the flat emission made at the peak value $h_0$ by the flash device 38. At a next step S117, the result of light measurement is stored as a value F(P), which is used later in obtaining the gain G(P) at a step S182. At a step S118, the flow comes back to the main routine.

A subroutine of the preliminary emission "b" to be executed at the step S57 of FIG. 6 is next described with reference to FIG. 13.

The preliminary emission "b" is triggered not by the FELK button but by the release switch SW2. In this case, all of the six light measuring areas are used for measuring light in such a way as to harmonize light control over the object image within the whole frame of the picture as evaluative emission control for the purpose of improving the operability of the system.

Figure 13:
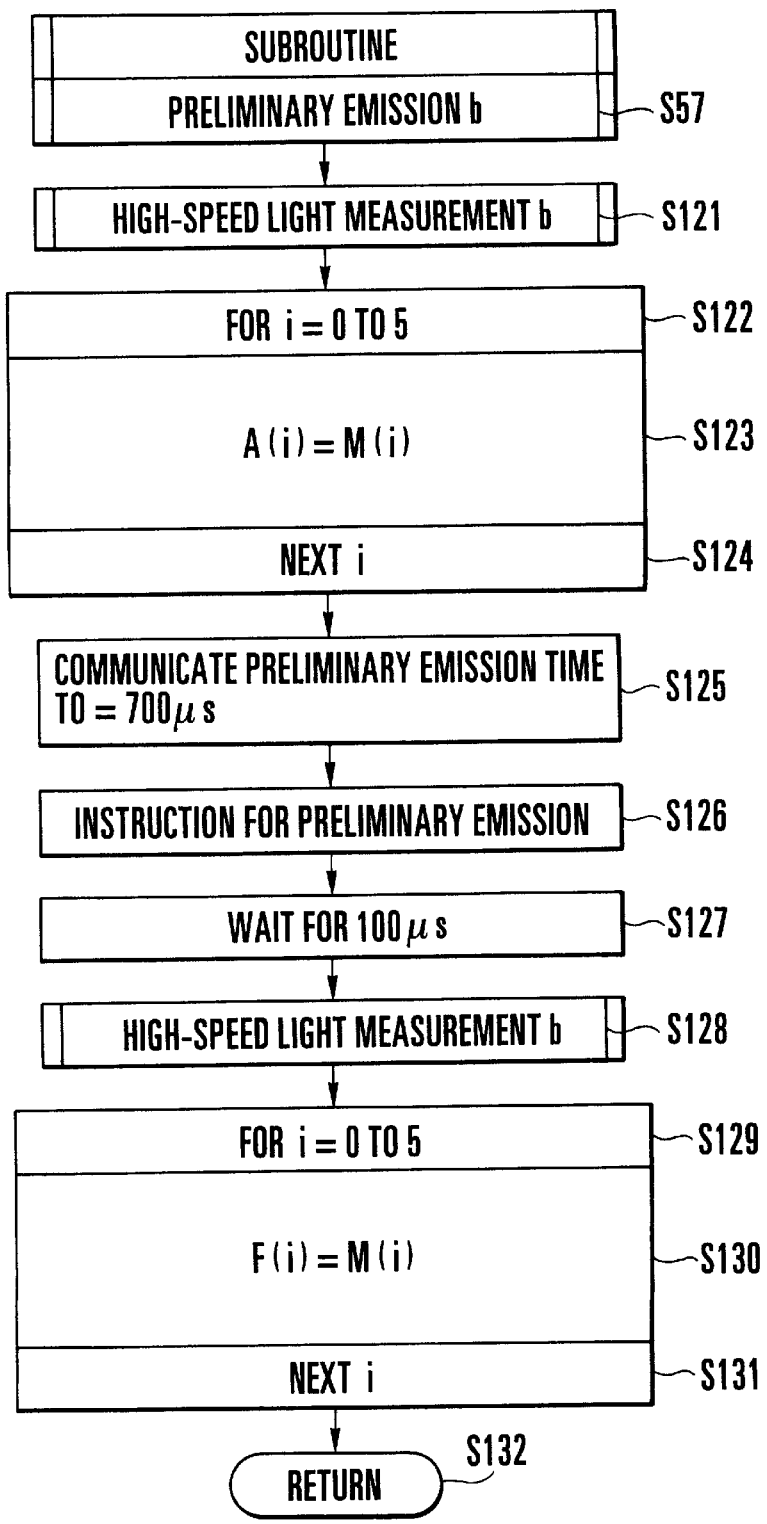
FIG. 13 is a flow chart showing a subroutine of preliminary emission "b" to be executed in the flow of operation of FIG. 6.

At a step S121 of FIG. 13, the high-speed light measurement "b" is performed. The subroutine of this high-speed light measurement "b" is first described with reference to FIG. 14.

Figure 14:
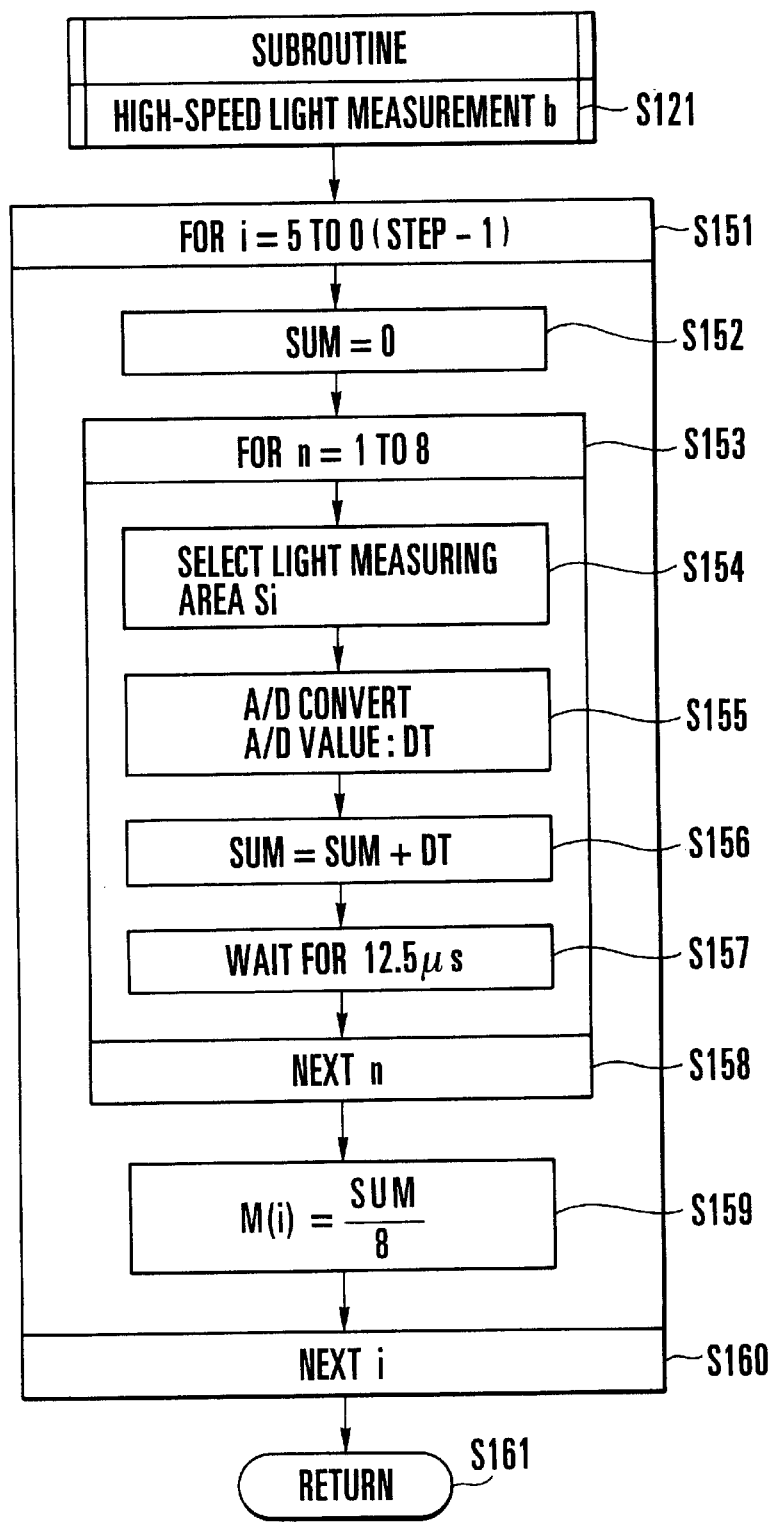
FIG. 14 is a flow chart showing a subroutine of high-speed light measurement "b" to be executed in the flow of operation shown in FIG. 13.

Referring to FIG. 14, steps S153 through are arranged to A/D convert outputs of the sensors Si eight times within a period of 100 $\mu$s and an average value of them is obtained as a value M(i) at a step S159. The steps S153 to S159 correspond respectively to the steps S143 to S149 of FIG. 11 described in the foregoing.

At the step S152, the work area is cleared [SUM=0]. At the step S151, light values are obtained from all of the six light measuring areas between the step S151 and a step S160 in a loop. The split light measuring areas S0 to S5 are measured in the order of from the area S5 to the area S0, which is reverse to a normal order. The reason for the reverse order is as follows. While the normal order presents no problem in measuring a steady external light, the preliminary flat emission involves the initial instability of the outputs of the light measuring sensor as the xenon lamp and the light measuring sensor do not stably operate for a while after the start of light emission as mentioned in the foregoing. Therefore, such areas that are more important than others among the split light measuring areas, such as the areas S0 and S2, are measured later than other areas to ensure that the measured values of the important areas are A/D converted in a stable state.

At a step S161, the flow comes back to the routine of FIG. 13. Then, at steps S122, S123 and S124 of FIG. 13, the measured value of steady external light is stored as a value A(i). After that, at a step S125, the preliminary emission time T0 is set to 700 μs, because a total period of 600 μs is necessary for the high-speed light measurement "b" and some wait time is also necessary for avoiding the build-up unstable region of the preliminary flat emission. At a step S127, the wait time of 100 μs is provided for the above-stated purpose. The information [T0=700 μs] is sent to the flash device 38 at the step S125 and an instruction for preliminary emission is sent to the flash device 38 at a step S126. In response to this instruction, the flash device 38 begins to emit light.

After the wait time of 100 μs at the step S127, the flow comes to a step S128 to carry out again the high-speed light measurement "b". At steps S129, S130 and S131, the measured values of light reflected by the object as a result of the preliminary flat emission and obtained from the split light measuring areas are stored as values F(i). At a step S132, the flow comes back to the main routine of FIG. 6.

Figure 19:
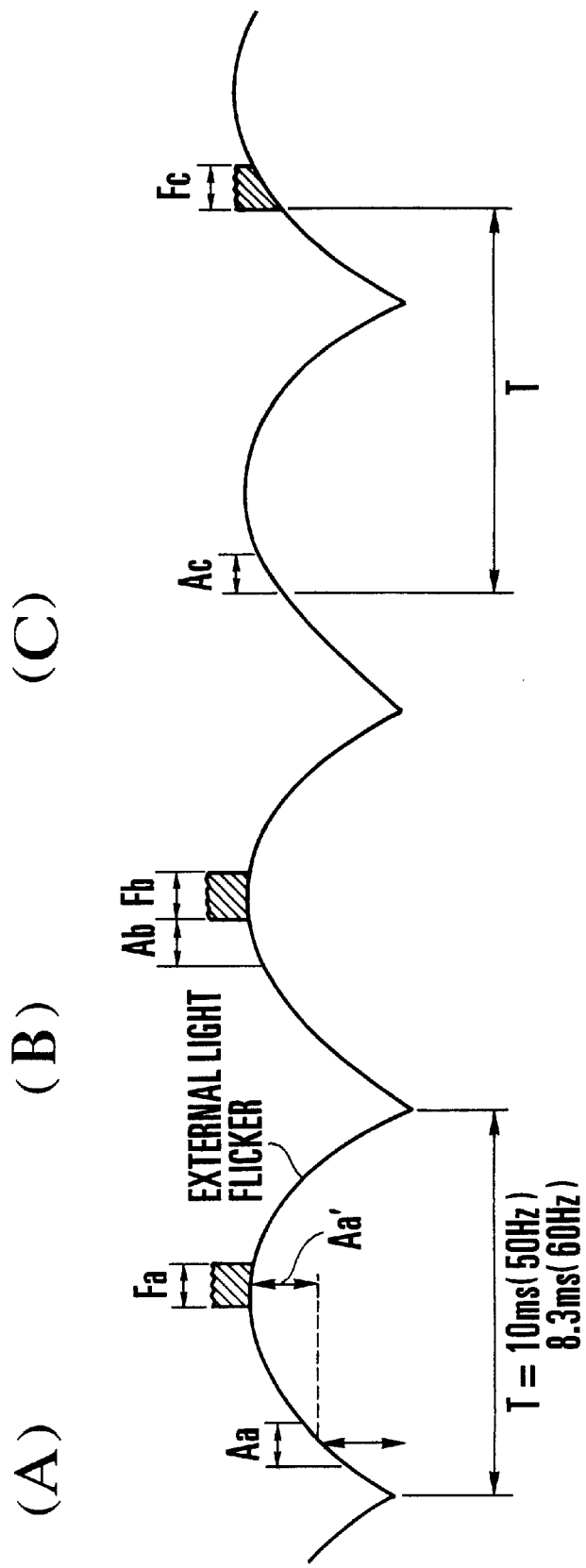
FIG. 19 shows a relation between a light measuring action performed at the time of preliminary emission and an external light measuring action in accordance with this invention.

As shown at a part (B) in FIG. 19, the light measuring action for the value A(i) of the step S121 (Ab in FIG. 19) and the light measuring action for the value F(i) of the step S128 (Fb in FIG. 19) are performed approximately 700 μs apart from each other. For a computing operation $2^{F(i)} - 2^{A(i)}$ to be carried out later to obtain a flash-device light component by removing the external light component from the measured light value obtained at the time of preliminary emission, these light measuring actions are preferably performed at points of time as close to each other as possible. The period of 700 μs is extremely short as compared with the period of flicker (10 ms). Any change in output that may be caused by a flicker is very small during the period of 700 μs and the result of computing operation of $2^{F(i)} - 2^{A(i)}$ is considered to be close to the measured value of only the flash-device light component. Therefore, the main emission can be adequately made by controlling it according to the result of the computation.

In the case of the preliminary emission "a", a condition better than the above-stated condition is obtained between the light measuring action for the value A(P) of the step S111 and the light measuring action for the value F(P) of the step S116. In this case, the difference in time is only 200 μs, which almost completely precludes the adverse effect of any flicker.

Figure 20:
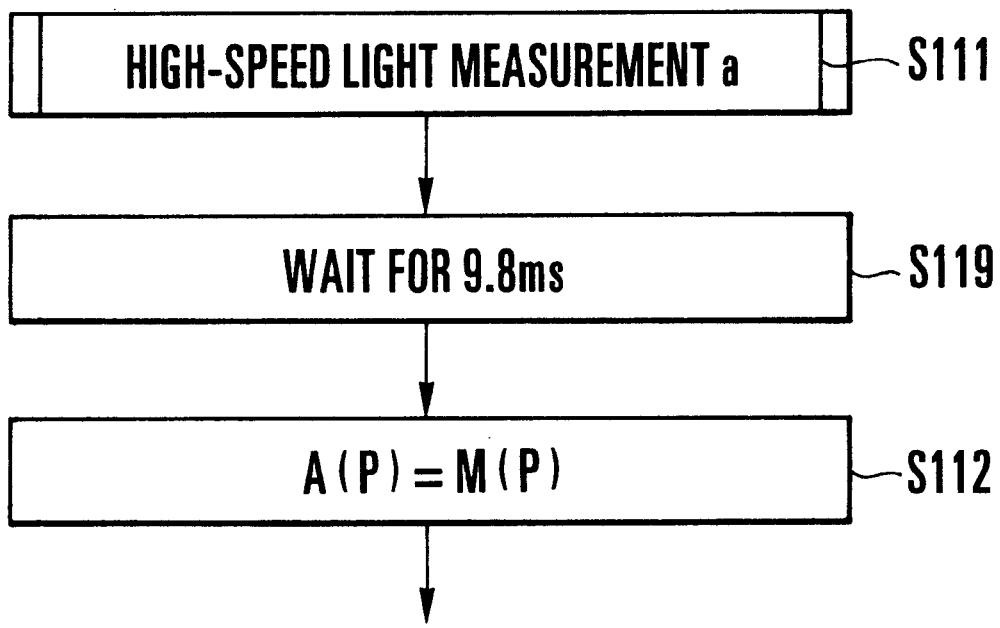
FIG. 20 is a flow chart showing, as another example, a subroutine of preliminary emission "c".

Further, the steps of light measurement also may be arranged as shown in FIG. 20. In the case of FIG. 20, the light measuring action for the value A(i) is performed at a step S111. After that, at a step S119, the flow of operation waits for the lapse of a period of time corresponding to one cycle of the flicker of a power line before it comes to a step S112 to perform the light measuring action for the value F(i). In this case, under the flicker of a power line of frequency 50 Hz, for example, the effective value of the cycle is 10 ms. In view of this, the wait time at the step S119 is preferably set at 9.8 ms (10 ms–200 μs=9.8 ms) in making the preliminary emission "b". As apparent from a part (C) of FIG. 19, the measured light value of the light measuring action Ac for the value A(i) approximately coincides with the value of the external light component obtained by the light measuring action Fc for the value F(i). Therefore, a flash-device light component can be more accurately obtained by the computing operation of $2^{F(i)} - 2^{A(i)}$.

Further, under the flicker of a power line of frequency 60 Hz, the effective value of the cycle is 8.3 ms. Therefore, in making the preliminary emission "b" under that condition, a step of waiting for a period of 7.6 ms (8.3 ms–700 μs=7.6 ms) is inserted in between the steps S124 and S125.

Further, by arranging the system to be capable of measuring the periods of flickers with a light measuring sensor and to automatically change the above-stated wait time from one wait time over to another according to the 50 Hz frequency or the 60 Hz frequency of the power line, the flash-device light component extracting action can be more accurately carried out.

A subroutine of computing the gains G and γ to be executed at the step S58 of FIG. 6 is next described below with reference to FIG. 15.

This operation has already been covered by the foregoing description of FIG. 4 with regard to the concept of controlling the main emission by carrying out preliminary emission.

Figure 15:
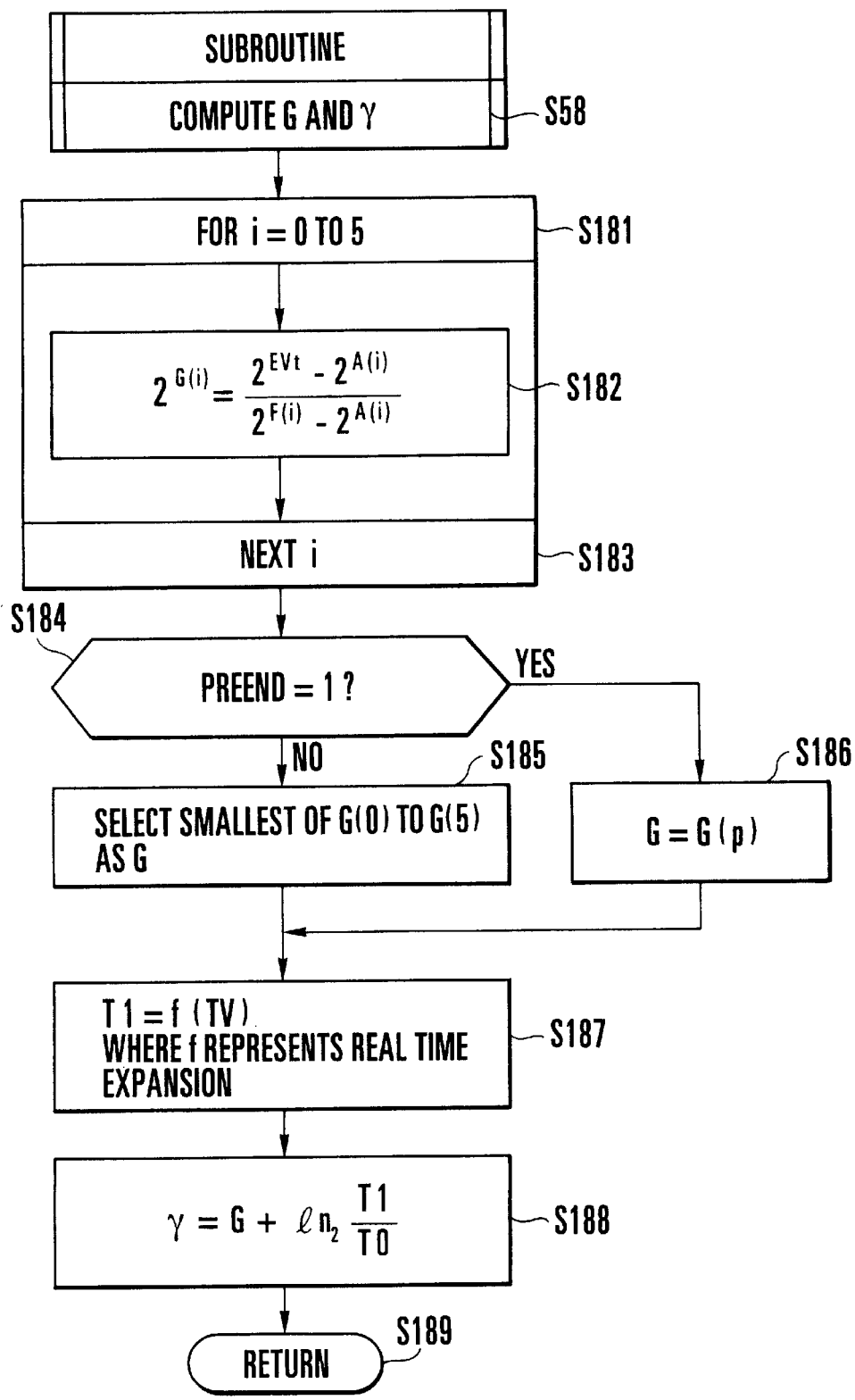
FIG. 15 is a flow chart showing a subroutine of computing gains G and γ in the flow of operation of FIG. 6.

Referring to FIG. 15, steps S181, S182 and S183 are for computing the gain G(i) and are the same as the step S04. At step S185, the gain G is obtained from the gain G(i) in a manner called a nearest-distance priority evaluative light control and is the same as the step S05, except in the following point. The step S185 is executed only when the system is not in the mode of FELK but in the mode called batch emission. While the system is in the FELK mode, the value G(P) which depends on the distance measuring point P is employed as the gain G at the step S186. At a step S187, the control shutter time TV (APEX) is real-time-expanded into a value T1.

At a step S188, a flash gain γ is expediently obtained including a case where the shutter time is higher than the synchronizing shutter time, as described already with respect to the step S08. At a step S189, the flow comes back to the main routine of FIG. 6.

A subroutine of controlling the shutter and instructing the flash device to emit light, which is to be executed at the step S60 of FIG. 6, is next described below with reference to FIG. 16.

Figure 16:
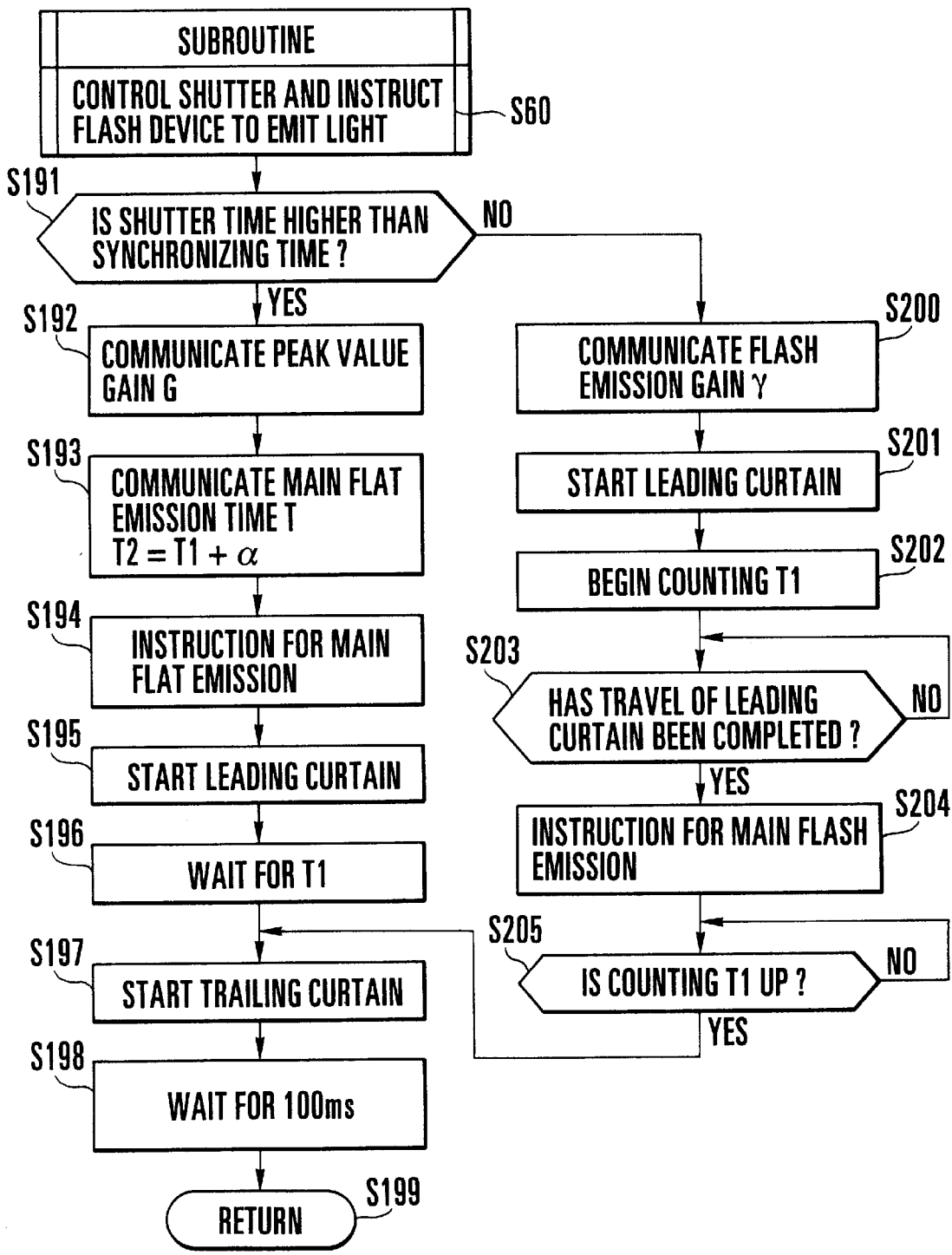
FIG. 16 is a flow chart showing a subroutine of controlling a shutter and instructing a flash device to emit light in the flow of operation of FIG. 6.

At step S191 of FIG. 16, a check is made to find if the shutter time is higher than the synchronizing shutter time. If so, the flow comes to a step S192 to send the peak value gain G to the flash device 38. At a step S193, a shutter time T2 which is obtained by adding a safety allowance α ms to the shutter curtain travel time of the shutter time T1 is sent to the flash device 38 as a main flat emission time. At a step S194, an instruction is given for main flat emission. At a step S195, the leading curtain of the shutter is allowed to start.

At a step S196, the flow of operation waits for a period of the shutter time T1. At a step S197, the trailing shutter curtain is allowed to start. At a step S198, the flow waits either for 100 ms or until completion of the travel of the trailing shutter curtain. At a step S199, the flow comes back to the main routine of FIG. 6.

If the shutter speed (time) is found to be lower than the synchronizing shutter time at the step S191, the flow comes to a step S200. At the step S200, the flash gain γ is sent to the flash device 38. At a next step S201, the leading shutter curtain is allowed to start. At a step S202, the shutter time T1 begins to be counted. At a step S203, the flow waits for completion of the travel of the leading shutter curtain. At a step S204, an instruction for main flash emission is given. The above-stated step. S203 may be executed according to turning-on of an X-sync contact. At a step S205, upon completion of the count of the shutter time T1, the flow comes to the step S197 to allow the trailing shutter curtain to start its travel. Upon completion of the travel of the trailing shutter curtain, the flow comes to the step S199 to come back to the main routine of FIG. 6.

In the case of the embodiment described, the system is arranged to carry out split light measurement by making preliminary flat emission and to control the intensity or the amount of emission of main emission on the basis of the measured light value obtained through the preliminary flat emission. The system according to the invention has an FELK operation mode or a first mode in which preliminary emission is made in response to a manual operation and a second mode in which preliminary emission is made immediately before moving up the mirror in response to a pushing operation on the release switch without performing the FELK action. In the first mode, the FELK action which reflects the intention of the operator to give excellent operability can be performed to carry out main flash-device emission control by using a partial light measuring area corresponding to a distance measuring point selected either arbitrarily by the operator or according to the visual line of the operator. In the second mode, to reflect the desire of the operator for taking an acceptable photograph without difficulty, the embodiment acts as a flash-device light control system which evaluatively controls the light, on the principle of giving priority to a nearest distance, according to the results of light measurement obtained from a plurality of light measuring areas including a plurality of selectable distance measuring points located around a central part.

More specifically, the flash photography system according to the embodiment is provided with a first process for making preliminary emission as the so-called flat emission, integrating the amount of emission of the preliminary emission directly on the side of the flash device and performing a so-called full-open light measuring action by the light measuring sensor of the camera, and a second process for giving an instruction indicating a number of times by which the integral value obtained by the preliminary emission should be multiplied for main emission in order to make the amount of emission of the main emission by the flash device apposite to a control EV value. To improve its operability, the flash photography system has a first mode in which the so-called FELK action is performed to make preliminary emission in response to a manual operation, and a second mode in which preliminary emission is made immediately before a mirror moving-up action in response to a pushing operation on the shutter release button. The first mode gives the above-stated advantage by controlling the flash device in the partial light control mode. The second mode gives a flash-device light control system of excellent operability by controlling the flash device in the evaluative light control mode.

Figure 17:
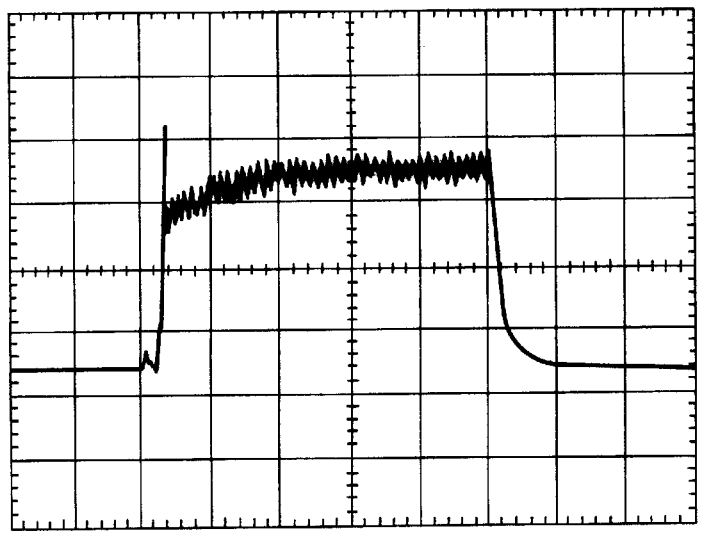
FIG. 17 is a waveform chart showing a light measuring action to be performed at the time of preliminary emission by the flash photography system.
Figure 17:
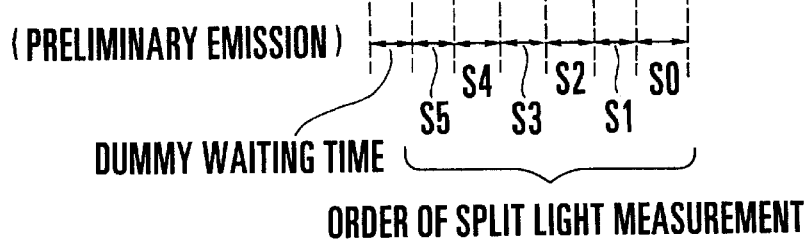

To prevent obtaining an erroneous measured light value due to the instability of emission intensity at the commencement of preliminary flat emission, the embodiment is arranged to simply insert a dummy wait time as shown in FIG. 17 without recourse to any complex arrangement. In the split light measuring areas S0 to S5 as shown in FIG. 2(B), light measurement is performed in the order of S5→S4→S3→S2→S1→S0. This order effectively makes it possible to accurately obtain the output for the central light measuring area which is generally more important than other areas.

Referring again to FIG. 2(B), when a left distance measuring point is selected, importance is attached to the left distance measuring point by changing the light measuring order, for example, in such a way as S5→S4→S2→S3→S0→S1. When a right distance measuring point is selected, the order is changed, for example, in such a way as S5→S3→S1→S4→S0→S2. This light measuring arrangement enables the system to more stably carry out flash-device emission control at the time of main emission.

In other words, the above-stated arrangement of the embodiment is based on the principle that light of the light measuring areas located farther away from a distance measuring point than others should be measured earlier than other areas located nearer to the distance measuring point. Further, the evaluative light control algorithm shown at the step S185 of FIG. 15 may be changed to weight the values as applicable instead of simply taking the smallest value.

The processes mentioned above not only prevent preliminary flat emission from being carried on unnecessarily over a long period of time but also enhance the accuracy of the light measuring action on important areas located in the central part of the picture plane or near to the distance measuring point by just including a minimum dummy wait time and by varying the light measuring order of the split light measuring areas according to their degrees of importance.

Further, in the case of the embodiment, the gain γ is defined by using the actual preliminary emission time T0 as expressed below:

$$\gamma = G + ln_2 \, (T1/T0) \text{ (see step S08)}$$

and $$Kx = Kp \times 2^\gamma \text{ (see step S28)}$$

However, the gain γ may be defined, for example, by using a preliminary emission time Tconst., (such as 1 ms) predetermined for computation as expressed below:

$$\gamma = G + ln_2 \, (T1/Tconst.) \tag{1}$$

$$Kx = Kp \times Tconst./T0) \times 2^\gamma$$

This method makes the gain γ which is to be sent from the camera to the flash device serve as an absolute scale independent of the actual preliminary emission time T0. Then, the gain γ can be used as an index value which corresponds to guide-number information and thus can be advantageously used for checking the system, etc.

The invention is applicable also to camera systems which are using image recording media other than films or image recording media which permit writing photographing information by a method other than a magnetic recording method.

The invention may be carried out by combining as desired the embodiment, its modifications and their technological elements described in the foregoing.

The invention is applicable to cameras of varied kinds, such as a single-lens reflex camera, a lens-shutter type camera, a video camera, etc., optical apparatus other than cameras, devices adapted for cameras, optical apparatuses and other apparatuses, and component elements forming these apparatuses and devices.

What is claimed is:

1. A flash photography system adapted to use a flash emission device for emitting a preliminary emission and a main emission, and arranged to control the main emission in accordance with data based on light measurement obtained from the preliminary emission, said system comprising:

a light measuring circuit arranged to obtain a first measured light value by measuring light reflected from an object as a result of the preliminary emission and to obtain a second measured light value by measuring light without the preliminary emission;

a detection circuit that detects the amount of light emitted by the flash emission device during a preliminary emission;

a determination circuit that obtains object brightness information from the first measured light value and the second measured light value, and obtains exposure value information required for exposure by the main emission, and determines the main emission on the basis of (1) a difference or ratio between said object brightness information and said exposure value information, and (2) the amount of light detected by the detection circuit.

2. A flash photography system according to claim 1, wherein the preliminary emission is a flat emission.

3. A flash photography system according to claim 1, wherein said system has a first mode in which the preliminary emission is made when an operation member is operated and a second mode in which the preliminary emission is made prior to the commencement of photography when a shutter release operation member is operated, wherein said light measuring circuit has a plurality of light measuring areas, and wherein the first measured light value is obtained from at least one predetermined area of the plurality of light measuring areas in the first mode, and is obtained in the second mode by evaluating measured light values obtained from a greater number of light measuring areas than in the first mode.

4. A flash photography system according to claim 3, wherein said at least one predetermined area corresponds to a focus detecting area.

5. A flash photography system according to claim 1, wherein said light measuring circuit is arranged to perform a light measuring operation for each of a plurality of areas, and wherein the light measuring operation to be performed on each of the plurality of areas at the time of preliminary emission is performed on predetermined areas before the light measuring operation is performed on an area or areas other than the predetermined areas.

6. A flash photography system according to claim 5, wherein the area or areas other than the predetermined areas are located in a central part among the plurality of areas.

7. A flash photography system according to claim 5, wherein the area or areas other than the predetermined areas correspond to a focus detecting area.

8. A flash photography system according to claim 1, wherein a light measuring operation of said light measuring circuit begins a predetermined period of time after commencement of the preliminary emission.

9. A flash photography system according to claim 1, further comprising a validating circuit that causes a light measurement output of said light measuring circuit obtained a predetermined period of time after commencement of the preliminary emission to be validated as data to be used for determining the first measured light value.

10. A flash photography system according to claim 1, further comprising a control part that causes said light measuring circuit to perform light measuring operations for obtaining the first and second measured light values at a time interval of about 10 ms or less.

11. A flash photography system according to claim 1, further comprising a control part that causes said light measuring circuit to perform light measuring operations for obtaining the first and second measured light values at a time interval corresponding to a flickering period of external light.

12. A camera system adapted to use a flash device having a light emission part and arranged to measure light from an object by causing the light emission part of the flash device to make a preliminary light emission, comprising:

a preliminary emission control circuit that operates in a first preliminary emission mode having an emission time and a second preliminary emission mode having an emission time shorter than the emission time of the first preliminary emission mode; and a light measuring circuit having a plurality of light measuring areas, said light measuring circuit being arranged to measure light at a greater number of light measuring areas in the first preliminary emission mode than in the second preliminary emission mode.

13. A camera system according to claim 12, wherein said light measuring circuit measures light at an area located in a central part of the plurality of light measuring areas in the second preliminary emission mode.

14. A camera system according to claim 13, wherein said camera system is capable of selecting a distance measuring point for the object, and wherein said light measuring circuit measures light in the second preliminary emission mode at an area corresponding to the selected distance measuring point.

15. A flash-device light control system adapted for use with a flash emission device for emitting a preliminary emission and a main emission, and arranged to measure a reflected light resulting from preliminary emission and to control main emission on the basis of a measured light value thus obtained, said system comprising:

a preliminary emission control circuit that operates in a first mode in which a preliminary emission is made in response to a manual operation independent of a shutter release operation and a second mode in which preliminary emission is made in response to a shutter release operation prior to the commencement of photography; and a light measurement circuit having plural light measurement areas and arranged to perform a partial light control in the first mode to obtain a light measurement value by using part of the plural light measurement areas, and to perform an evaluative light control in the second mode to obtain a light measurement value by using more light measurement areas than that used by the partial light control.

16. A flash-device light control system according to claim 15, wherein the partial light control in the first mode is performed on the basis of a measured light value obtained from a light measuring area corresponding to a selected distance measuring point.

17. A flash-device light control system adapted for use with a flash emission device for emitting a preliminary emission and a main emission, said system comprising:

light measuring means, having a plurality of light measuring areas, for performing a light measuring operation when the flash emission device is emitting the preliminary emission;

flash-device control means for controlling main emission on the basis of a measured light value obtained by said light measuring means;

an operation member that causes preliminary emission to begin; and light control means for performing partial light control, when said operation member is operated, by causing a preliminary emission in response to operation of said operation member and by measuring a reflected light caused by the preliminary emission and coming from an area corresponding to a selected focus detecting point among the light measuring areas, and for performing evaluative light control, when a shutter release operation is performed without operating said operation member, by causing a preliminary emission prior to the commencement of photography and by measuring light reflected, as a result of the preliminary emission, from each of the light measuring areas, in such a manner as to give weight concentrated on an area that corresponds to a focus detecting point relative to a closest object from among other selectable focus detecting points.

18. A flash-device light control system adapted for use with a flash emission device for emitting a preliminary flash emission and a main flash emission, said system comprising:

light measuring means, having a plurality of light measuring areas, for performing a light measuring operation on a reflected light caused by a preliminary flat emission at the plurality of light measuring areas;

emission control means for controlling main emission on the basis of a measured light value obtained by said light measuring means; and light measuring order control means for causing the detection of light measurement values to be performed in a time serial order relative to each light measurement area, said light measuring order control means causing the detection of a light measurement value corresponding to a selected detection area or the detection of the light measurement value of a center light measurement area to be performed after a detection of a light measurement value of at least one other light measurement area.

19. A flash-device light control system according to claim 18, wherein, among the plurality of light measuring areas, the areas located nearer to a central part among the plurality of light measuring areas are weighted with respect to said detection of light measurement values.

20. A flash-device control system for a flash emitting device that emits a preliminary flash emission and a main flash emission, the preliminary flash emission being a preliminary flat emission, said system comprising:

light measuring means for performing a light measuring operation on a reflected light caused by a preliminary flat emission;

emission control means for controlling main emission on the basis of a measured light value obtained by said light measuring means;

a timer which generates an output a predetermined time after a start of said preliminary flat emission, and a control circuit which supplies an output of said light measuring means to said emission control means in response to the output of said timer.

21. A flash photography system adapted to use a flash device for emitting a preliminary emission and a main emission, and arranged to control main emission according to data of light measurement obtained from the preliminary emission, said system comprising:

a light measuring circuit arranged to obtain a first measured light value by measuring light reflected from an object as a result of a preliminary emission;

a detection circuit that detects a preliminary emission light amount emitted by a flash emission part of the flash device at the time of the preliminary emission;

a determination circuit that determines a main emission light amount on the basis of a difference or ratio between an object brightness condition obtained from the preliminary emission corresponding to the first measured light value and a brightness condition required for a main flash exposure, and the light amount detected by the detection circuit; and a control circuit that controls the flash emission device so that it performs the main emission with a main emission light amount determined by the determination circuit.

22. A flash emission device that emits a preliminary emission and a main emission for use with a camera, the camera comprising (a) a light measuring circuit arranged to obtain a first measured light value by measuring light reflected from an object as a result of a preliminary emission, and (b) a determination circuit that determines an amount of main emission light on the basis of a difference or ratio between an object brightness condition obtained from the preliminary emission corresponding to the first measured light value and a brightness condition required for a main flash exposure, said flash emission device comprising:

a detection circuit that detects an amount of preliminary emission light emitted by said flash emission device at a time of a preliminary emission; and a control circuit that controls the flash emission device so as to perform main emission with a main emission light amount determined by the determination circuit of the camera.

* * * * *